United States Patent [19]
Nakazato et al.

[11] Patent Number: 5,461,311
[45] Date of Patent: Oct. 24, 1995

[54] ROD AXIAL POSITION DETECTOR INCLUDING PLURAL SCALES WHEREIN NONMAGNETIZED PORTIONS HAVE DIFFERING SPACING AND DIFFERING DEPTHS AND MEANS FOR CALCULATING THE ABSOLUTE POSITION ARE PROVIDED

[75] Inventors: Masakazu Nakazato; Youichi Shimoura; Masamichi Sugihara, all of Kanagawa, Japan

[73] Assignee: Kayaba Kogyo Kabushiki Kaisha, Tokyo, Japan

[21] Appl. No.: 168,728

[22] Filed: Dec. 16, 1993

[30] Foreign Application Priority Data

| Dec. 24, 1992 | [JP] | Japan | 4-344901 |
| Jan. 6, 1993 | [JP] | Japan | 5-000831 |
| May 14, 1993 | [JP] | Japan | 5-113144 |
| May 18, 1993 | [JP] | Japan | 5-116151 |

[51] Int. Cl.$^6$ .................................................. G01P 3/52
[52] U.S. Cl. .................................. 324/207.24; 364/562
[58] Field of Search .................................. 324/173, 174, 324/207.15, 207.16, 207.17, 207.20, 207.21, 207.24, 207.22, 207.25; 340/672; 364/560, 561, 562

[56] References Cited

U.S. PATENT DOCUMENTS

| 3,132,337 | 5/1964 | Martin | 324/165 |
| 4,072,893 | 2/1978 | Huwyler | 324/207.25 |
| 4,142,153 | 2/1979 | Smith | 324/165 |
| 4,305,072 | 12/1981 | Makita | 324/207.22 |
| 4,663,588 | 5/1987 | Himuro et al. | 324/207.24 |
| 4,771,237 | 9/1988 | Daley | 324/202 |
| 4,851,771 | 7/1989 | Ikeda et al. | 324/207.24 |
| 4,951,048 | 8/1990 | Ichikawa et al. | 324/207.24 |
| 4,972,332 | 11/1990 | Luebberiy et al. | 340/672 |
| 5,299,143 | 3/1994 | Hellinga et al. | 364/561 |

*Primary Examiner*—Sandra L. O'Shea
*Assistant Examiner*—Roger Phillips
*Attorney, Agent, or Firm*—Jordan and Hamburg

[57] ABSTRACT

A magnetic scale is formed by a plurality of non-magnetic parts arranged at equidistant intervals in all axial direction on a magnetic rod which displaces in the axial direction. The non-magnetic parts consist of first non-magnetic parts having a constant depth, and second non-magnetic parts having a different depth. A magnetic sensor which outputs a signal according to the depth and positional change of the non-magnetic parts is installed at a fixed position opposite the magnetic scale. Further provided are a mechanism for identifying a second non-magnetic part which has passed the magnetic sensor based on the output of the sensor, a memory for individually storing the absolute positions of the second non-magnetic parts, and a mechanism for calculating the displacement of the rod from the identified second non-magnetic part to its current position based oil the sensor output. The absolute position of the rod is detected, in terms of a small displacement from its stationary position, by computing it from the absolute position of the identified second non-magnetic part stored in the memory and the displacement of the rod from this second non-magnetic part. This assembly comprises only a single magnetic scale having several types of non-magnetic parts, and is therefore more economical to manufacture than the conventional assembly having a plurality of magnetic scales.

5 Claims, 30 Drawing Sheets

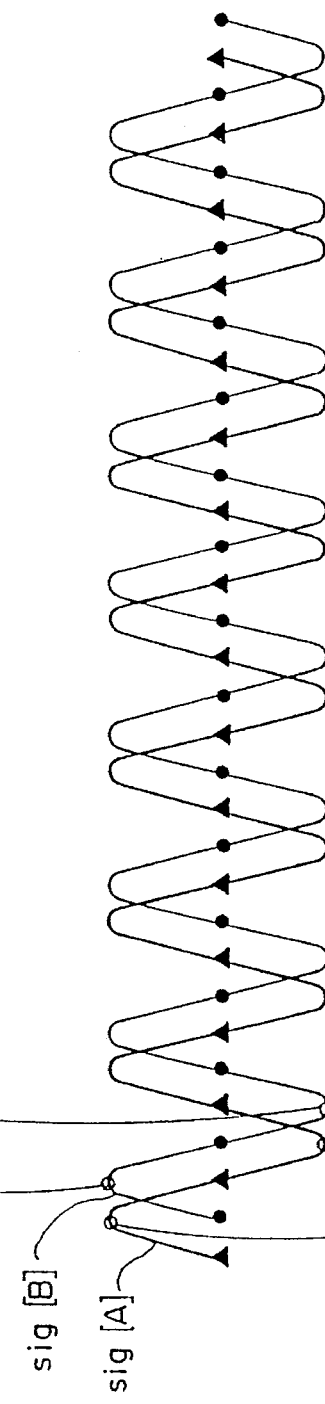
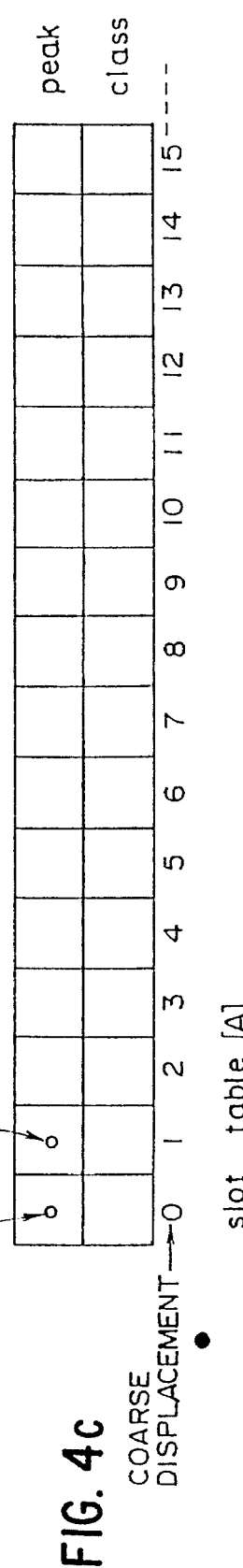
FIG. 4a
FIG. 4b
FIG. 4c

5,461,311

ROD AXIAL POSITION DETECTOR INCLUDING PLURAL SCALES WHEREIN NONMAGNETIZED PORTIONS HAVE DIFFERING SPACING AND DIFFERING DEPTHS AND MEANS FOR CALCULATING THE ABSOLUTE POSITION ARE PROVIDED

FIELD OF THE INVENTION

This invention relates to a device for detecting a displacement position of a hydraulic cylinder piston rod by means of a magnetic scale and a sensor which responds to this magnetism.

BACKGROUND OF THE INVENTION

A position detector for detecting the linear displacement position of a piston rod in a hydraulic cylinder by means of a magnetic scale and sensor is described in, for example, Japanese Tokkai Hei 4-136713 published by the Japanese Patent Office.

In this detector, non-magnetic parts are formed at a fixed interval in an axial direction to act as a magnetic scale on the circumference of a piston rod of magnetic material, and a magnetic sensor which outputs a sine wave according to the passage of the non-magnetic parts is fixed to the cylinder.

If the absolute position at which the displacement of the piston rod starts is not known, its absolute position after displacement cannot be known. A limit switch is therefore provided at the most contracted or most elongated position of the piston rod. When the cylinder is used, i.e. when the power to the position detector is switched on, the piston rod is first brought to its most contracted or most elongated position so as to switch the limit switch on or off. When the limit switch is switched on or off, the piston rod is detected to have reached a reference point, and the displacement of the piston rod cam then be followed until the power is switched off by determining its distance from the reference point from the output signal of the magnetic sensor.

However, if the piston rod is linked to other mechanisms, the whole mechanism assembly has to suffer a large displacement in order to detect the reference point each time the power is switched on.

In Japanese Tokkai 4-71114 published by the Japanese Patent Office, a position detector is described wherein a subscale consisting of a plurality of graduations at unequal intervals is provided on the piston rod parallel to the main scale used to detect the distance through which the rod moves, a second magnetic sensor being fixed to the cylinder to detect the magnetic variation according to the motion of the subscale. In this detector, if two graduations of the subscale pass in front of the second sensor, it can be determined which graduations have passed from the interval between them. Therefore, if these graduations are taken as reference points for the distance measurement on the main scale, they can be used as a reference close to the position at which the piston rod comes to rest, thereby avoiding the trouble of moving the piston rod to the most contracted or elongated position each time the power to the detector is switched oil. In this case also, once a reference point has been detected, the displacement of the piston rod can be followed until the power is switched off.

There was however a problem in that the cost of position detection was increased by having a main scale and a subscale over the entire length of the piston rod.

SUMMARY OF THE INVENTION

The object of this invention is therefore to provide position detector of low cost having a mechanism for determining a reference position for a small displacement of a rod.

In order to achieve this object, this invention provides an axial position detector for a rod made of magnetic material. The detector comprises a magnetic scale with a plurality of non-magnetic parts arranged axially on the rod at an equal pitch interval. These non-magnetic parts comprise first non-magnetic parts having a constant depth and second non-magnetic parts having a different depth. A magnetic sensor is fixed opposite the scale and outputs a signal according to the depth and positional change of the non-magnetic parts and a mechanism for detecting a current position of the rod based on this signal is further provided. The detecting mechanism comprises a mechanism for identifying a second non-magnetic part which has passed the magnetic sensor based on the output signal of the magnetic sensor, a memory for individually storing absolute positions of the second non-magnetic parts, a mechanism for calculating a displacement amount from the identified second magnetic part to the current position of the rod based on the output signal of the magnetic sensor, and a mechanism for calculating an absolute position of the rod from the absolute position of the identified second magnetic part and the displacement amount therefrom.

Preferably, the magnetic sensor comprises two sensor units which output two sine waves having a 90 degrees phase difference according to the positional change of the magnetic parts of the magnetic scale, and the displacement amount calculating mechanism comprises a mechanism for calculating a center level from peak values at every pitch interval of the sine waves, a mechanism for detecting that a non-magnetic part has passed the magnetic sensor based on a comparison of the center level and the sine waves, a mechanism for counting a number of the passed non-magnetic parts, a mechanism for correcting the sine waves such that they have equal amplitude at every pitch interval of the non-magnetic parts, a mechanism for calculating a distance between the non-magnetic part which has passed the sensor the most recently and the scissor by metals of inverse trigonometric functions using the two corrected sine waves, and a mechanism for calculating the displacement amount of the rod from the counted number and calculated distance.

If the second non-magnetic parts are arranged at different pitch intervals, the identifying mechanism may comprise a mechanism for detecting the intervals between the second nonmagnetic parts which have passed the magnetic sensor and a mechanism for specifying the second non-magnetic parts which have passed the magnetic sensor from the detected intervals.

Alternatively, if the second non-magnetic parts are arranged such that they all have different depths, the identifying mechanism may comprise a mechanism for detecting the depths of the second non-magnetic parts which have passed the magnetic sensor from the sensor output signal and a mechanism for specifying the second non-magnetic parts which have passed the magnetic sensor from the detected depths. In this case the second magnetic parts may be disposed at equal pitch intervals.

Also preferably, the second non-magnetic parts are symmetrically disposed on both sides of a predetermined position on the rod, and are arranged such that the intervals between them in one direction from the center are all different. In this case, the identifying mechanism comprises a mechanism for distinguishing on which side of the predetermined position the magnetic sensor is situated, a mechanism for detecting the intervals between the second nine-magnetic parts which have passed the sensor, and a mechanism for specifying the second non-magnetic parts which have passed the sensor from the distinguished side and detected intervals.

In this case, the second non-magnetic parts on one side of the predetermined position have a different depth from the second non-magnetic parts on another side, and the distinguishing mechanism comprises a mechanism for determining the depths of the second non-magnetic parts from the scissor output signal.

Alternatively, the detector may further comprise a second magnetic scale disposed on one side of the predetermined position parallel to the aforesaid magnetic scale and a second magnetic sensor provided at a fixed position which outputs a signal according to a positional change of the second magnetic scale. In this case, the position detecting mechanism comprises a mechanism for distinguishing on which side of the predetermined position the first magnetic sensor is situated from the output signal of the second magnetic sensor, a mechanism for identifying a second non-magnetic part which has passed the first magnetic sensor based on the distinguished side and the output signal of the first magnetic sensor, a memory for individually storing absolute positions of the second non-magnetic parts, a mechanism for calculating a displacement amount from the identified second non-magnetic part to the current position of the rod based on the output of the first magnetic sensor, and a mechanism for calculating an absolute position of the rod from the absolute position of the identified second non-magnetic part and the displacement amount therefrom.

BRIEF DESCRIPTION OF THE DRAWINGS

FIG. 4a–4c one explanatory diagrams of a RAM which stores peak values of the output signals of the magnetic sensor, sig [A] and sig [B], according to the first embodiment.

DESCRIPTION OF THE PREFERRED EMBODIMENTS

Figure 1:
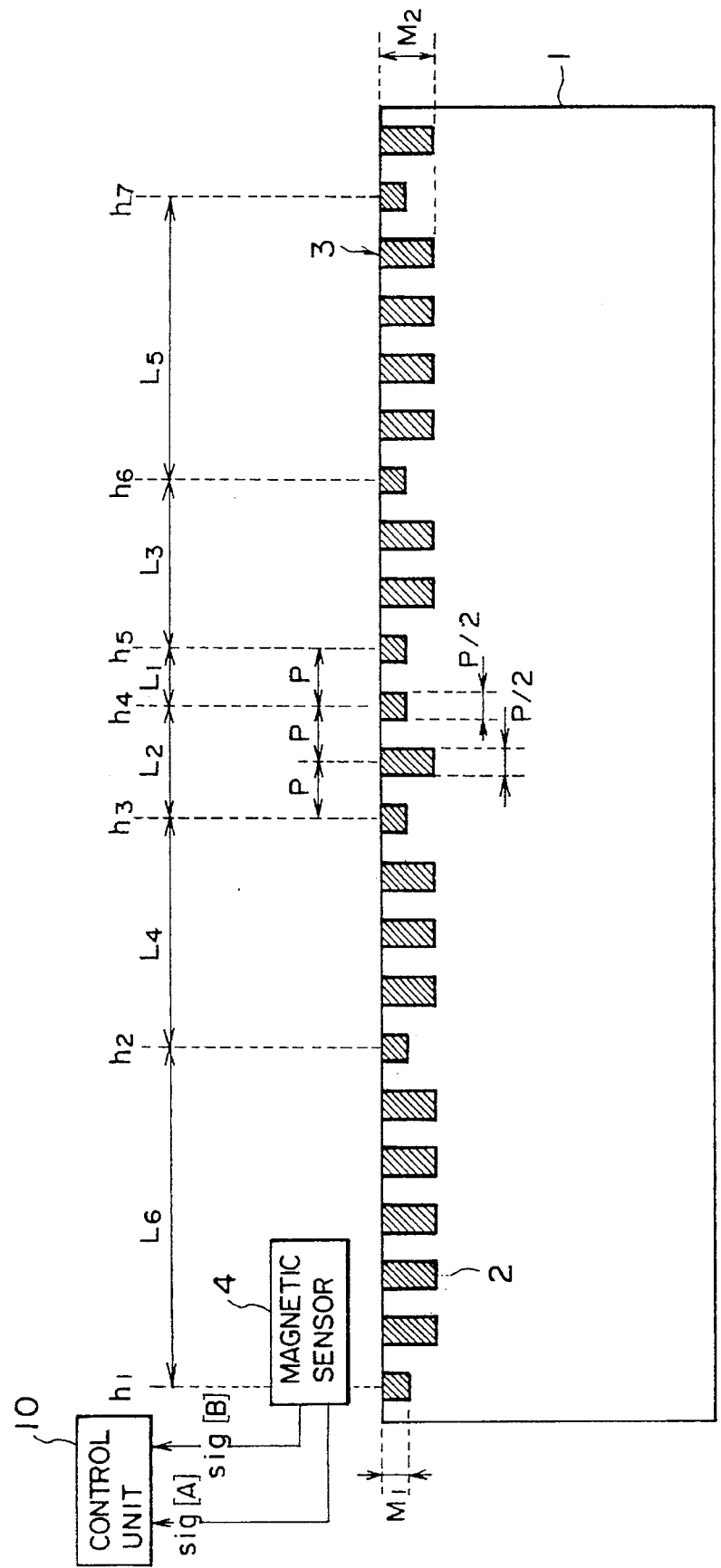
FIG. 1 is a schematic diagram of a magnetic scale according to a first embodiment of the invention.

Referring to FIG. 1 of the drawings, according to the first embodiment of this invention, a piston rod 1 consisting of a strongly magnetic material projects from a hydraulic cylinder tube, not shown, such that it is free to slide, and displaces in an axial direction between a maximum contraction position and a maximum elongation position according to the hydraulic pressure supplied to the hydraulic cylinder.

A magnetic scale 3 is formed oil the piston rod 1. A plurality of non-magnetic parts 2 having a width P/2 are disposed at a pitch interval P in the axial direction on the surface of the piston rod 1.

Some of these non-magnetic parts 2 are disposed at predetermined reference points $h_1$, $h_2$, $h_3$, $h_4$, $h_5$, $h_6$, $h_7$. In order to distinguish between non-magnetic parts 2 which are formed as reference points mid those which are not, the former are formed with a depth $M_1$, while the latter are formed with a depth $M_2$. According to this embodiment, $M_1<M_2$.

The intervals between the reference points $h_1$–$h_7$ are set as follows. The interval between the reference points $h_4$ and $h_5$, which are situated effectively in the center of the total displacement range of the piston rod 1, is set at a value $L_1$ equal to the pitch interval P, and the interval L between reference points is gradually increased from the reference points $h_4$ and $h_5$ towards both ends. L is set to a different value between different reference points such that the condition $L_1<L_2<L_3<L_4<L_5<L_6$ is satisfied.

A magnetic sensor 4 which detects the displacement of the magnetic scale 3 is fixed at one end of the hydraulic cylinder, not shown. The magnetic sensor 4 consists of a pair of sensor units which output two sine wave signals having a phase difference of 90 degrees corresponding to one pitch interval of the magnetic scale 3. The output signal of this magnetic sensor 4 is input to a control unit 10.

Figure 2:
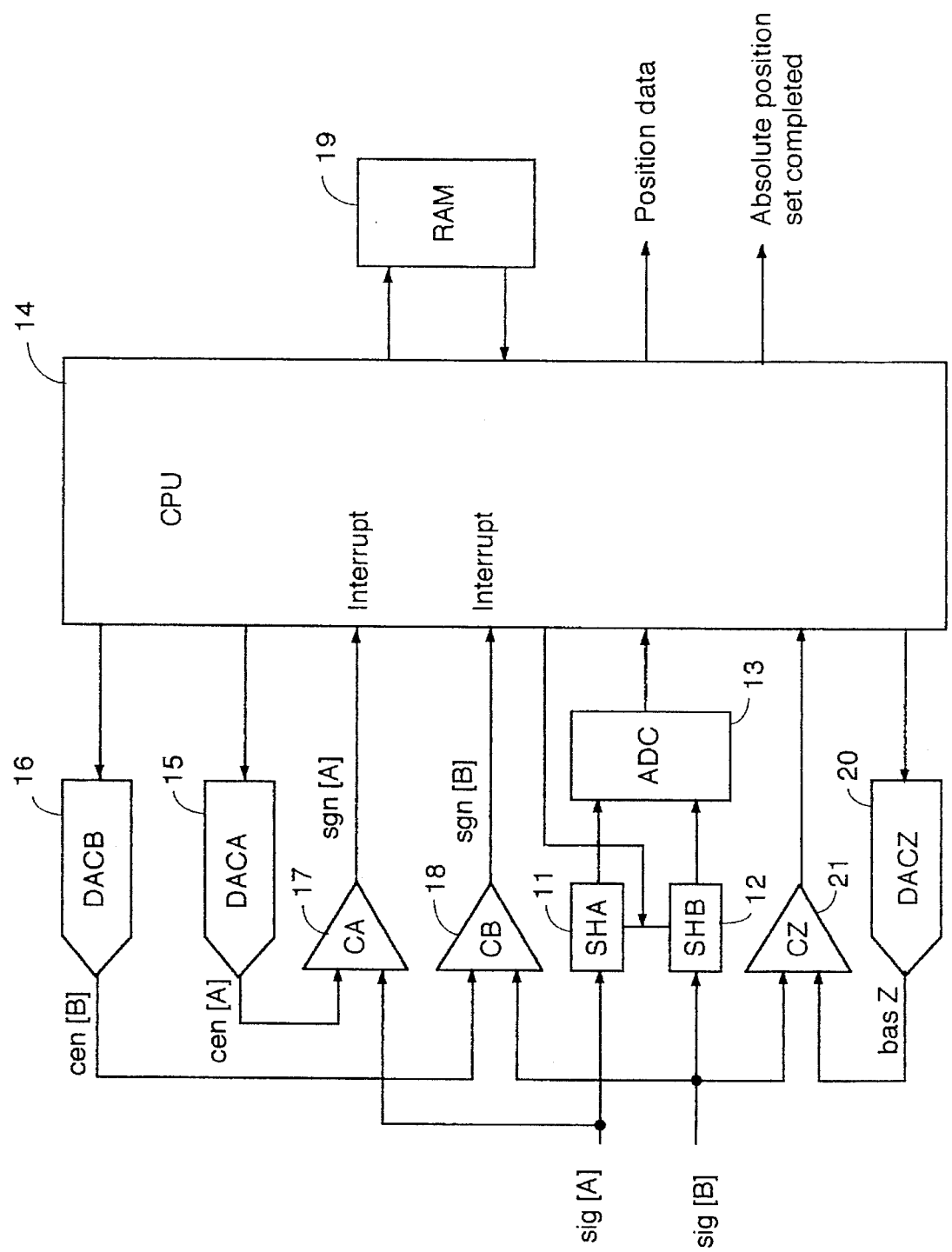
FIG. 2 is a block diagram showing a construction of a control unit according to the first embodiment.

The control unit 10 comprises a microprocessor or the like, as shown in FIG. 2. The two signals sig [A], sig [B] of different phases output from the magnetic sensor 4 are input to a CPU 14 via sample hold circuits 11, 12 and au analog/digital converter 13.

Center levels cen [A], cen [B], which are digital values found from the peak values in a slot table to be hereinafter described, are converted to analog voltages in digital/analog converters 15, 16 for each phase, and input to comparators 17, 18.

In the comparators 17, 18, the aforesaid center levels cen [A], cen [B] and the sensor signals sig [A], sig [B] are respectively compared. If the sensor output signals are larger than the center levels, an "H" level signal is output, whereas if they are smaller, an "L" level signal is output.

Figure 3:
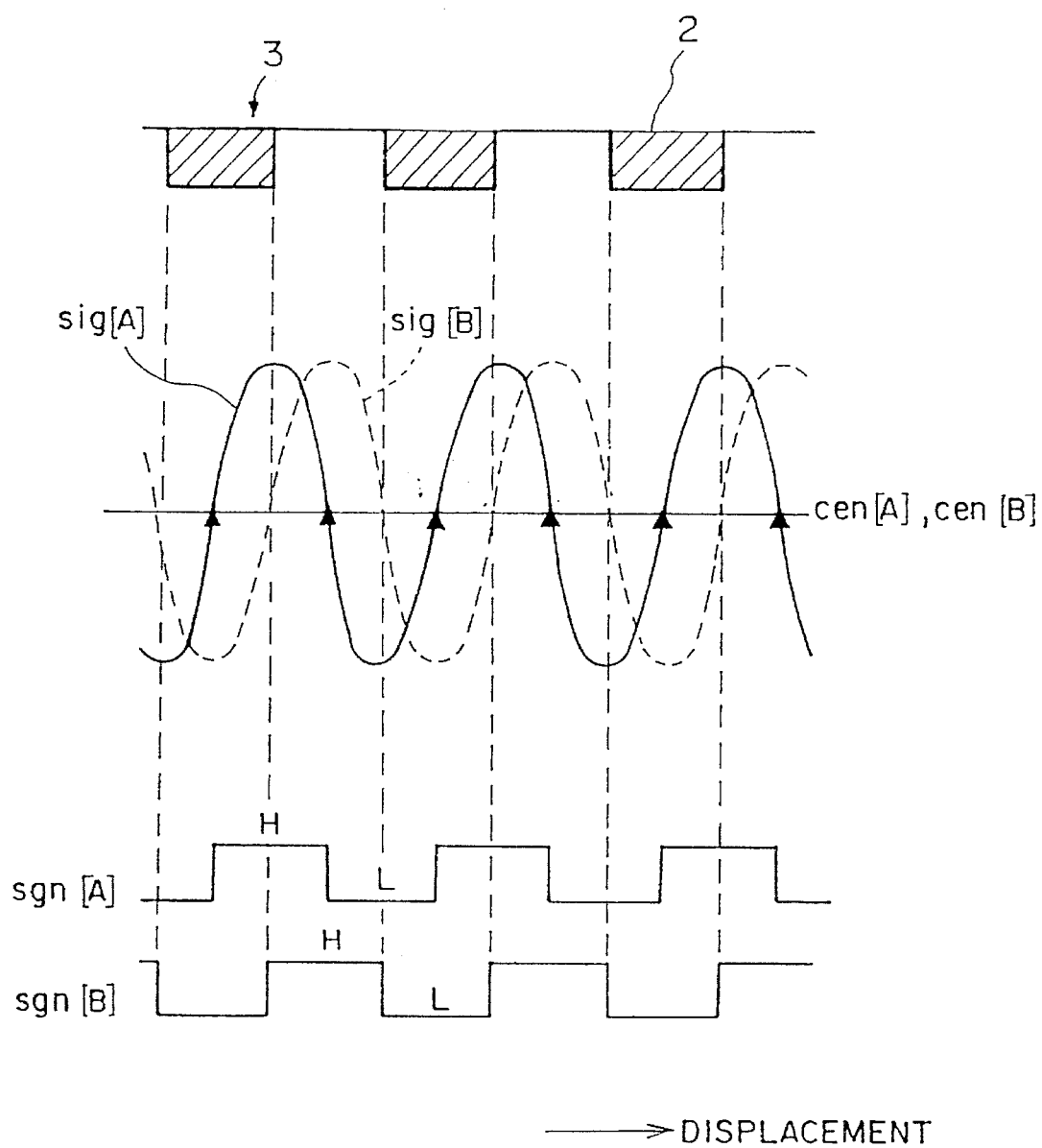
FIG. 3 is a waveform diagram for comparing output signals of a magnetic sensor and a comparator according to the first embodiment.

The comparator output signals sgn [A] and sgn [B] are the alternation of these "H" and "L" level signals and vary every P/2 when the two output signals sig [A] and sig [B] from the magnetic sensor 4 cross the center levels, as shown in FIG. 3. The approximate displacement distance (coarse distance) of the piston rod 1 is obtained by counting the number of these variations of the signals sgn [A] and sgn [B]. Since these signals sgn [A] and sgn [B] have a phase difference of 90 degrees corresponding to that of sig [A] and sig [B], measurement and updating of the peak values of sig [A] and sig [B] are respectively performed at a timing when sgn [B] and sgn [A] vary.

With these signals the CPU 14 performs the following operations:

storing and updating of peak values of the output signals from the magnetic sensor 4, center level adjustment, counting number of center level crossings by sensor output signals, normalization of output signals, computation of fine displacement from count start point, combined processing of count number and flue displacement, and sensor error detection.

[1] Storage of peak values of the output signals from the magnetic sensor 4

Slot tables [A], [B] for storing the peak values of the output signals sig [A], sig [B] every pitch interval are provided in a RAM 19 as shown in FIG. 4a–4c. These slot tables [A], [B] contain peak values (maxima and minima), and a class which expresses the type of the peak value stored.

The peak values are first assigned such that maxima correspond to even slot numbers, and minima correspond to odd slot numbers. Actual measured values are then stored according to this rule, but all guessed values are stored when initialization is carried out.

There are three values per class (MEASURE, ESTIMATE, GUESS) according to the type of peak value. When initialization is carried out, GUESS values are assigned to all positions. When measurements are performed, MEASURE values are assigned to slot number positions. When measurement results are reflected in peripheral slots, ESTIMATE values are assigned. The class functions as a weighting coefficient (MEASURE, ESTIMATE, GUESS) for determining new values when peak values are updated, as thereinafter described.

[2] Counting number of center level crossings by the sensor output signals, and computation of normalization coefficient and the center level of the sensor output signals.

Figure 5:
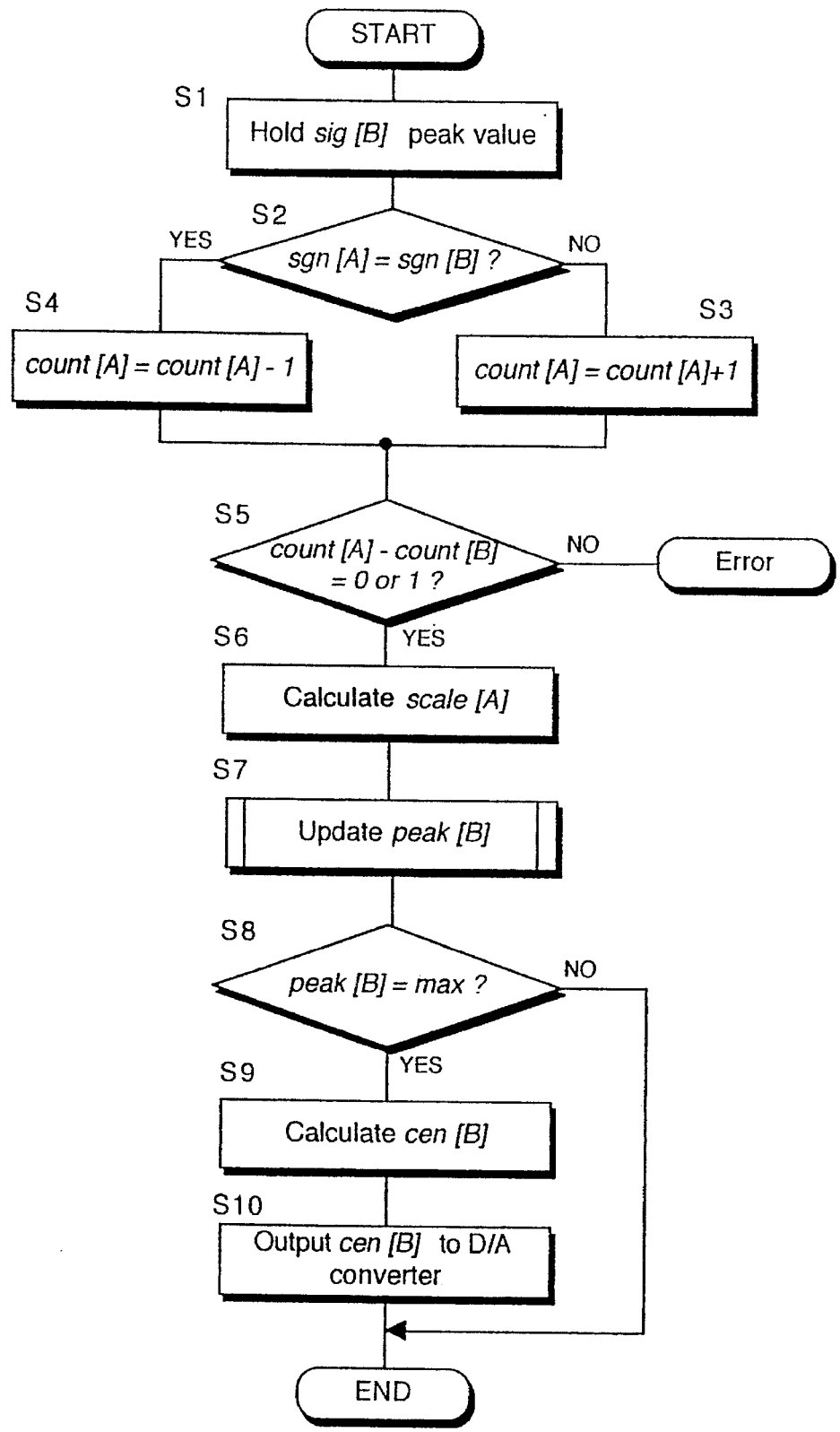
FIG. 5 is a flowchart showing a process of calculating a normalization coefficient scale [A], and a center level cen [B] according to the first embodiment.
Figure 6:
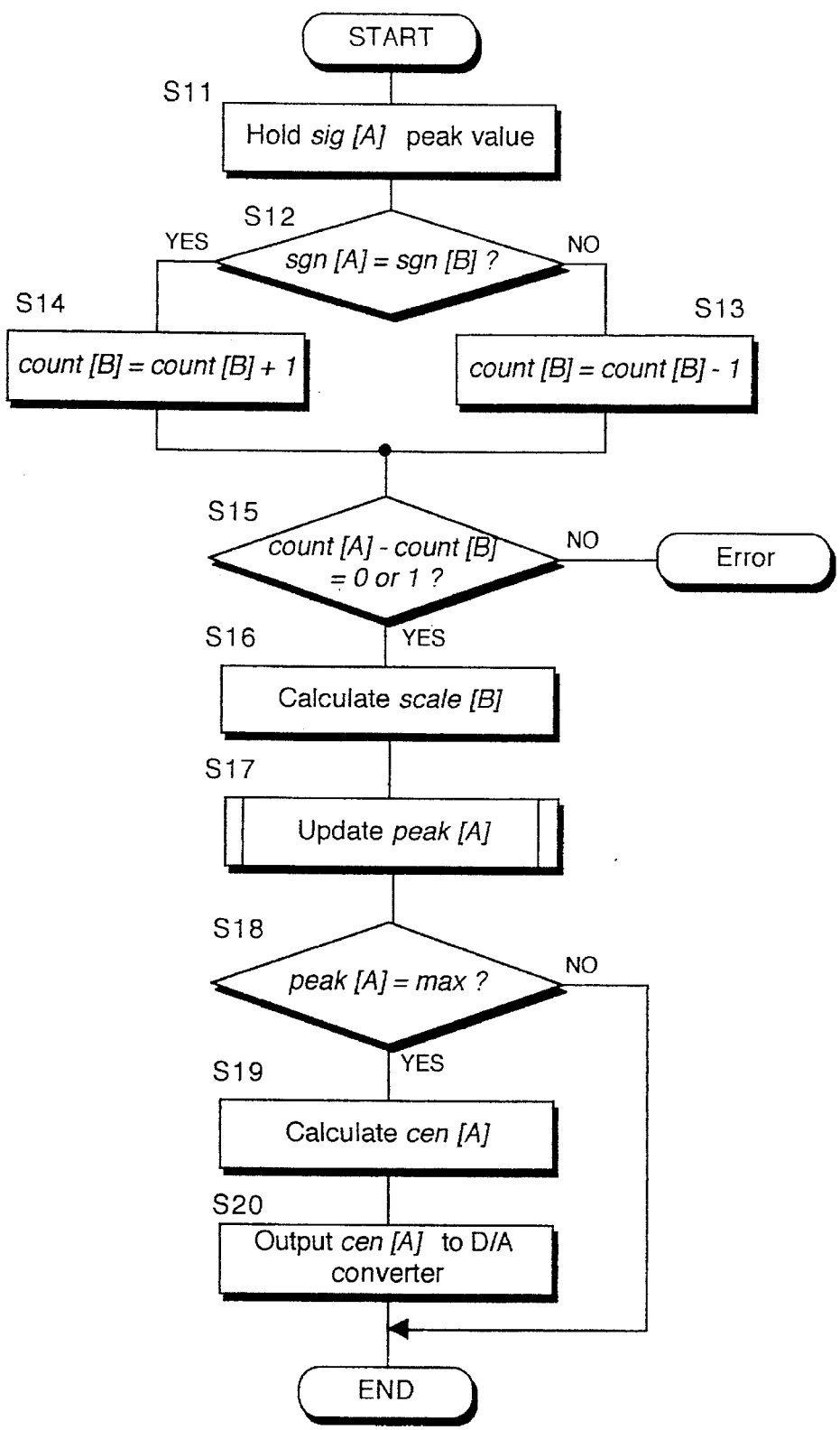
FIG. 6 is a flowchart showing a process of calculating a normalization coefficient scale [B], and a center level cen [A] according to the first embodiment.

This procedure is executed when the output signals for sig [A], sig [B] cross their center levels. FIG. 5 shows the processing when sig [A] crosses its center level, and FIG. 6 shows the processing when sig [B] crosses its center level. As the processing is almost identical for both output signals, the processing will be described for the case when sig [A] crosses its center.

When sig [A] crosses its center, sig [B] has either its maximum or minimum value. This value of sig [B] is therefore input to sample hold, and entered as a peak value in the parameter peak [B] (S1 in FIG. 5).

The counter value count [A] is increased or decreased depending on whether the output signals sgn [A], sgn [B] are identical or not (S2, 3, 4).

As there is a 90 degrees phase difference between the output signals sig [A], sig [B], one phase either leads or follows the other depending on the displacement direction of the piston rod 1. If the direction wherein the phase of sig [A] is ahead of sig [B] by 90 degrees (left direction in FIG. 1) is taken as the forward direction, as can be seen also from FIG. 3a–ed, the comparator output signal sgn [A] immediately after the output signal sig [A] crosses the center level has a different value from the other comparator output signal sgn [B]. On the other hand, the comparator output signals sgn [A] and sgn [B] immediately after sig [B] crosses the center level are identical when the piston rod I is displaced in the forward direction. When the piston rod 1 is displaced in the forward direction, therefore, the counter value count [A] is increased, and when it is displaced in the reverse direction, the counter value count [A] is decreased (S2, 3 and 4). This processing is given priority by the CPU 14.

The counter values count [A] and the value count [B] are first initialized so that the difference between them is either 0 or 1. If the difference count [A] —count [B] is not 0 or 1, therefore, it may be concluded that there is a fault such as a break in a sensor signal cable.

The counter value count [A] changes when the output signal sig [A] crossed its center level cen [A]. The center level cen [A] is found from the average value of several maximum and minimum values stored in the slot table [A]. From these values and cen [A], a normalization coefficient scale [A] is then calculated (S6), using the equation:

scale [A]=1/ |peak value—cen [A]|

This normalization coefficient scale [A] is intended to correct the difference of amplitude of sig [A] for each pitch interval of the main scale to the same level, and is used for normalization when computing the fine displacement hereinafter described. If for example the normalized value of |peak value—cen [A]|is 1, and a measured value was twice this magnitude, the normalization coefficient is ½. When the output signal sig [A] is multiplied by this coefficient, the amplitude is corrected to 1, and is thereby adjusted to be the same level as the normalized amplitude.

It is determined whether or not the most recent peak value peak [B] is a maximum value, not a minimum, and if so, the center level cen [B] of the output signal sig [B] is computed (S8, 9). The center level is computed as the average of the maximum and minimum values over several pitch intervals. This computation result is output as the center level cen [B] to the digital/analog converter 16 in FIG. 2 (S10).

The processing of the counter value count [B] when sig [B] crossed the center level is also performed as shown in FIG. 6. In this case, however, the counter value is increased when sgn [A] and sgn [B] are identical, and decreased when sgn [A] and sgn [B] are different.

(3) Updating of output signal peak value

Figure 7:
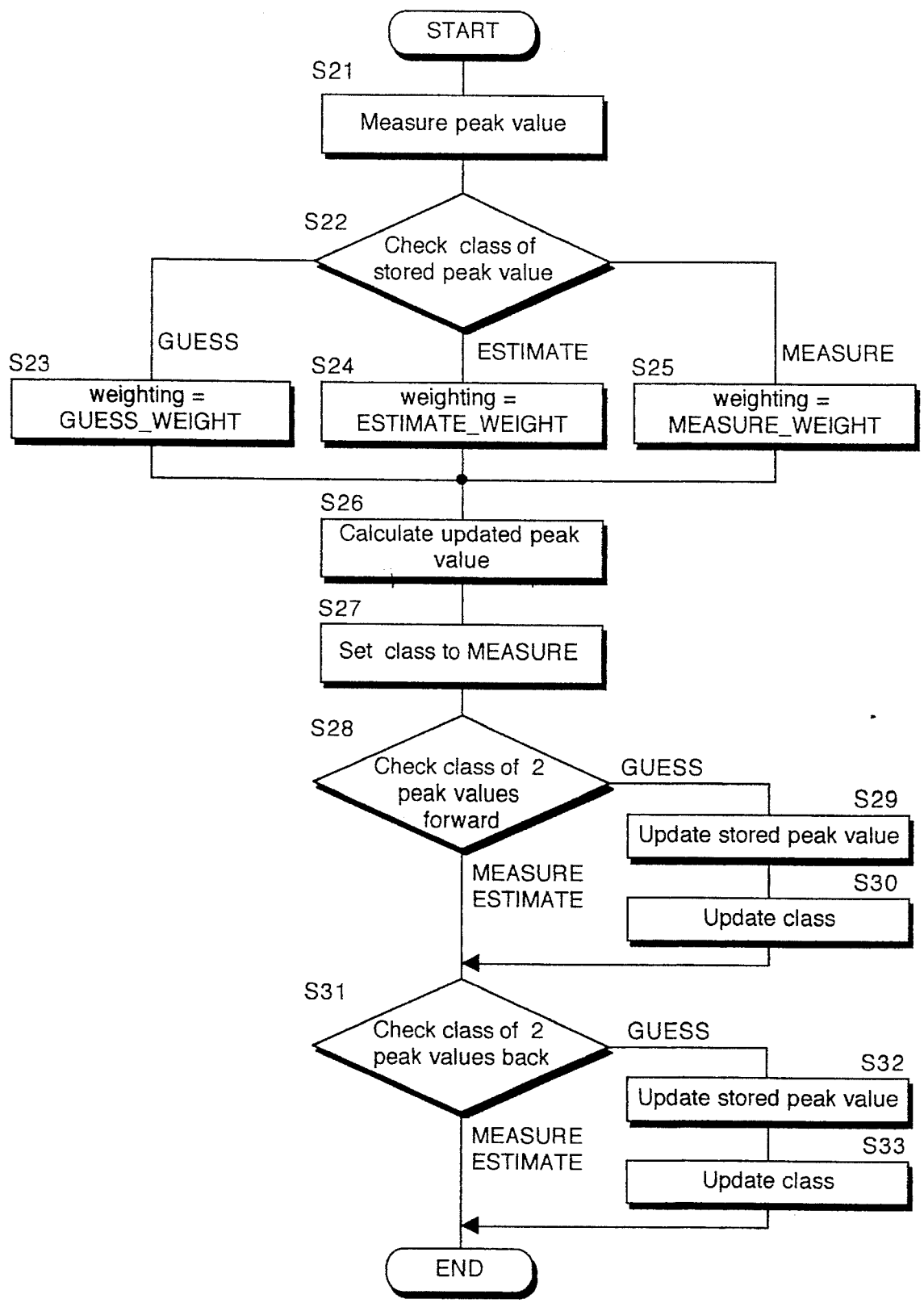
FIG. 7 is a flowchart showing the process of updating the peak values according to the first embodiment.

FIG. 7 shows the updating of peak values of both output signals, but as updating is performed on the other signal when center cross processing is carried out on the first signal, the updating is here represented by the output signal sig [B] (S7 in FIG. 5).

In FIG. 7, the peak value of the output signal sig [B] which has been stored peak hold when the output signal sig [A] is crossing its center, is A/D converted, and stored as a peak value peak [B] (S21). If this peak value corresponds to the sixth value, for example, a weighting coefficient (MEASURE WEIGHT, ESTIMATE WEIGHT or GUESS WEIGHT) stored in the sixth class slot is selected, and entered in the parameter weight (S22–25).

The sixth peak value is then updated based on the value of this parameter weight and another weighting coefficient T WEIGHT using the following equation (S26):

Updated value=(original value, T WEIGHT+peak [B], weight)/(T WEIGHT+ weight)

The coefficient for the sixth class is then replaced by the measured value MEASURE (S27).

The above weighting coefficients T WEIGHT, MEASURE WEIGHT are normally 1, otherwise they are chosen to satisfy the relation MEASURE WEIGHT<ESTIMATE WEIGHT<GUESS WEIGHT.

Further, if the class of the two peak values which immediately follow and the two peak values which immediately precede the current slot number is GUESS, the current updated peak value is stored instead of the previously stored peak value, and by updating the class to ESTIMATE, the stored peak value in the slot table is made to approach the real value at an early stage (S28–33).

(4) Combination of fine displacement and count number

This processing is performed at Fixed intervals.

Figure 8:
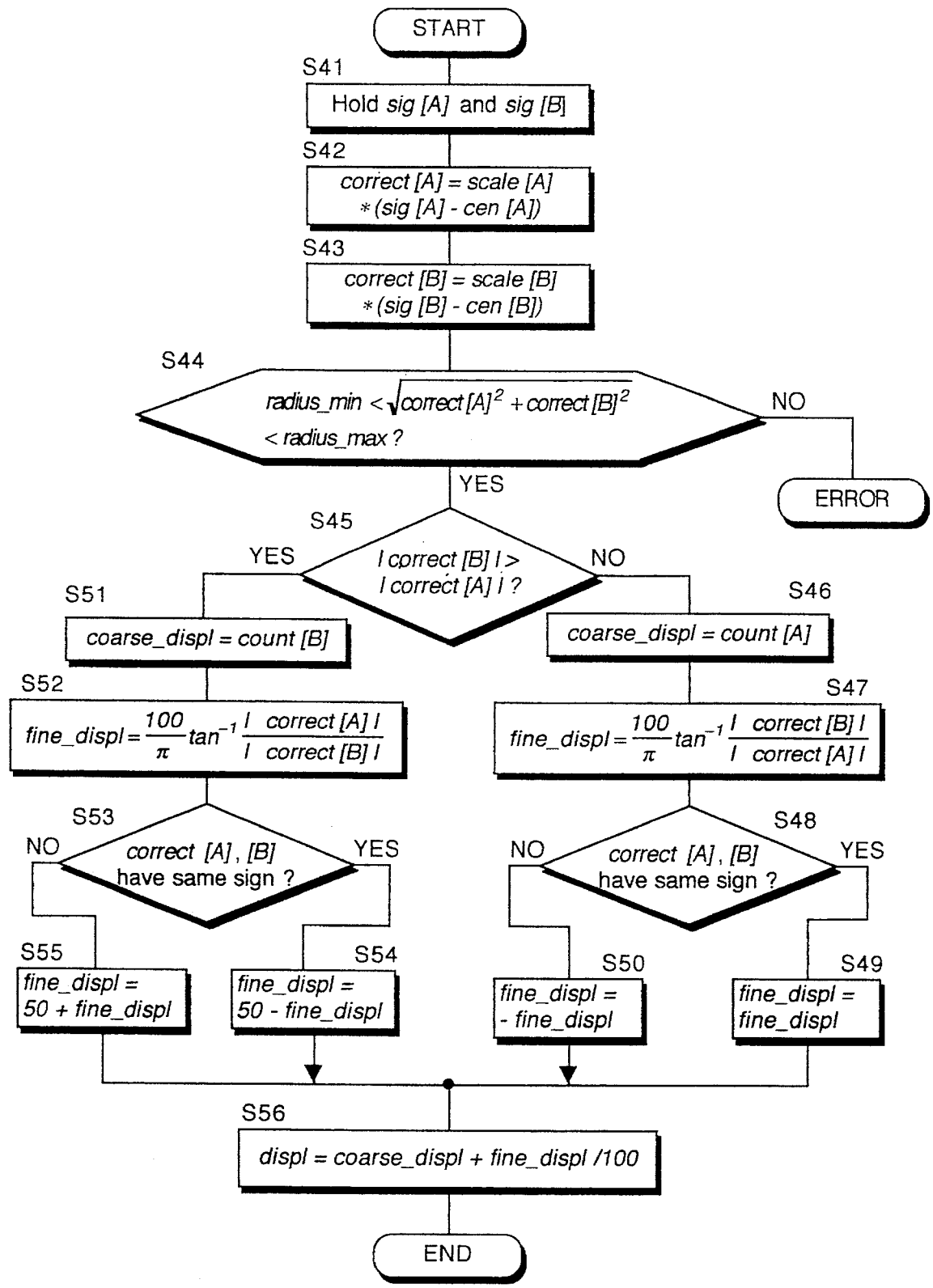
FIG. 8 is a flowchart showing a process of calculating a displacement amount according to the first embodiment.

As shown in FIG. 8, after first applying sample hold simultaneously to both phase output signals, A/D conversion is sequentially performed on the signals, which are then read together as the phased output signals sig [A], sig [B] (S41).

The normalized phased signals (normalized amplitude signals) using the output signals, center levels and the above normalization coefficient, i.e. correct [A], correct [B] , are then respectively calculated by means of the following equations (S42, 43):

correct [A]=scale [A]* [sig [A]—cen [A]]

correct [B]=scale [B]&33 [sig [B]—cen [B]]

The normalization correct [A], correct [B] should have the relation correct$^2$ [A]+ correct$^2$ [B]=1. If this value does not fall within a certain range around 1, it is determined that there is a fault, i.e. a wire break or short circuit in the magnetic sensor 4 (S44). These limits allay be decided by considering noise tolerance levels, and the permitted range for the phase difference between the output signals.

Figure 9:
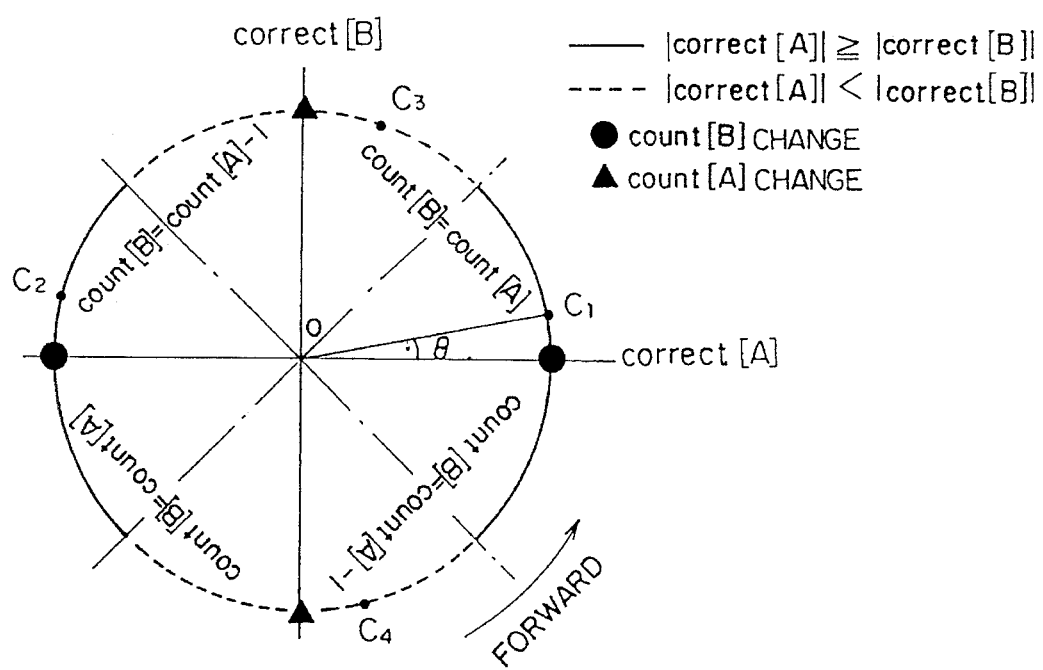
FIG. 9 is an explanatory diagram showing a calculation of normalization signals correct [A] and correct [B] according to the first embodiment.

The displacement of the piston rod is computed from the normalized signals correct [A], correct [B] using the chart in FIG. 9. This chart is based on the fact that the normalized signals correct [A], correct [B] are sine waves having a phase difference of 90 degrees, having a relation $\sin^2\theta + \cos^2\theta = 1$.

If for example the pitch interval of the non-magnetic parts 3 of the main scale 2 is 2 mm, the aforesaid counting is performed in 1 mm units, This counter value corresponds to the coarse displacement of the piston rod 1, and if the fine displacement is obtained by dividing the coarse displacement into 100 parts, the fine displacement, fine displ, at the point $C_1$ in FIG. 9, may be found from the relation θ:π=fine displ: 100. This relation is rewritten as:

fine displ=(100/π)*θ

Where, $\theta = \tan^{-1}$ |correct [B]|/|[correct [A]|
As a result, the fine displ is expressed as follows:

fine displ=(100/π)* tan$^{-1}$(|correct [B]|/|correct [A]|)

As shown in FIG. 9, the method of finding the fine displ is different according to which of the eight areas deflated by the horizontal and vertical axis and the ±45 degrees lines, (¼)π, (¾)π, (5/4)π and (7/4)π, the current displacement position is situated in.

Within the range defined by the sectors of the circle in FIG. 9 bounded by solid lines, |correct [A]|≦|correct [B]|. In this case, by finding fine displ from the above formula, the distance from the horizontal axis specified by correct [B]=0 can be found. This fine displacement is always a positive value, but if the anticlockwise direction in the figure is taken as the positive direction, the ranges in which the displacement position frown the origin is positive are only 0<θ≦(¼)π and π<θ≦ (5/4)π, and the fine displacement from the origin on the horizontal axis within the range(¾)π<θ<πor (7/4)π<θ≦2π, as typified by the point $C_2$ in FIG. 9, is given by fine displacement=fine displ.

On the other hand, the range defined by the sectors of the circle in FIG. 9 bounded by dotted lines, is [correct [A]< [correct [B]]|. In this case, fine displ is given by the following formula:

fine displ=(100/π)* tan$^{-1}$(|correct [A]|/|correct [B]|)

The fine displ obtained by this formula is the distance from the vertical axis specified by correct [A]=0. In this case, considering the displacement direction from the vertical axis and the fact that vertical position=horizontal position+50, the fine displacement is obtained as follows (S48–50 or S53–55).

In the range $(1/4)\pi<\theta\leq\pi/2$ or $(5/4)\pi<\theta\leq3/2\pi)$ (e.g. point $C_3$):

fine displacement=50−fine displ whereas in the range $\pi/2<\theta\leq(3/4)\pi$ or $3/2\pi<\theta\leq7/4\pi$ (e.g. point $C_4$):

fine displacement=50+fine dispt

Concerning the coarse displacement, the absolute values of the two normalized signals are compared, and the coarse displacement counter value in the direction in which the counter value does not change in the current region is selected. In other words, in the range in which |correct [B]|≤|correct [A]|, the count [A] is selected because the count [A] does not change in that region, whereas in the region |correct [B]|>|correct [A]|, the count [B] is selected. These values are entered in coarse displ which indicates the coarse displacement (S45, 46 or S45,51).

The fine displ computed from an inverse trigonometric function of the displacement amount of the piston rod 1 and the coarse displacement found from the count number are added together, and the total displacement of the piston rod 1 is found (S56) from:

total displacement (mm)=coarse displ+(fine displ/100)

In this way, the two phase sensor output signals are processed and the center level adjustment mid normalization of sensor output signals are performed for every pitch interval of the magnetic scale 3 so that the total displacement can be detected with high precision even if the signals from the magnetic sensor 4 vary.

At the same time, the control unit 10 performs the following processing on the output of the magnetic sensor 4 so as to convert the total displacement obtained to an absolute position.

Figure 10:
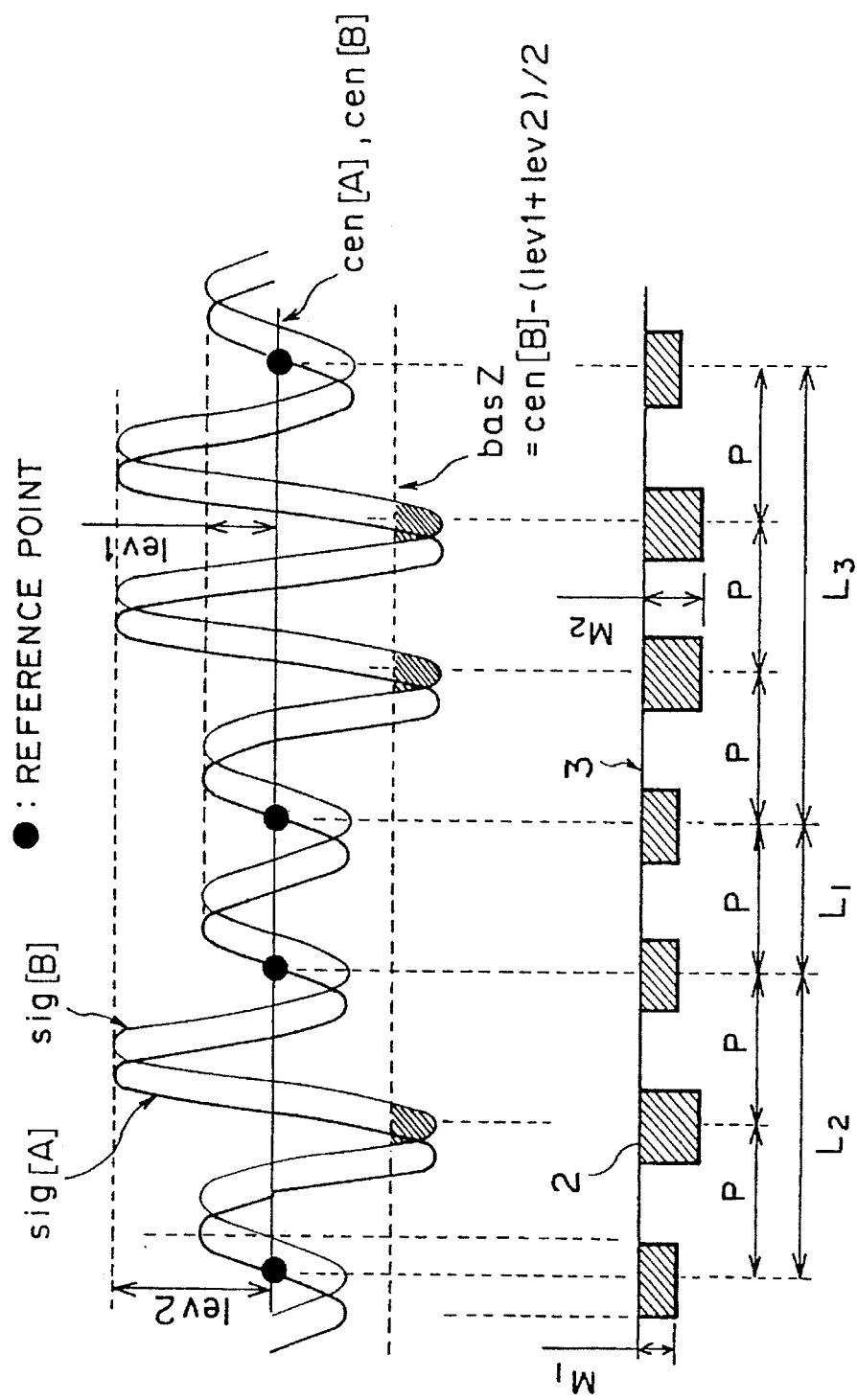
FIG. 10a and 10b are waveform diagrams showing magnetic sensor output signals and amplitude determining levels according to the first embodiment.

As shown in FIG. 10a and 10b, the control unit 10, based on the two phased outputs from the magnetic sensor 4 identifies reference points when:

the signal sig [A] from the magnetic sensor 4 crosses its center level cen [A], sig [B] is in the vicinity of its negative peak value.

the level of sig [B] is above its amplitude determining level basZ.

This condition corresponds to the center point of the non-magnetic parts 2 having a depth $M_1$.

The center point of the non-magnetic parts 2 having a depth $M_2$ is excluded from the reference points because sig [B] is below the specified level basZ as shown by the shaded area of FIG. 10a.

Writing lev1 as the predetermined value of the amplitude level when the depth of the non-magnetic parts is $M_1$, and writing lev2 as the predetermined value of the amplitude level when the depth is $M_2$, the amplitude determining level basZ is calculated from basZ=cen [B]−(lev1+lev2)/2

It is determined that the depth of the non-magnetic parts 2 is $M_2$ when the determining level basZ is greater than sig [B], and that the depth is $M_1$ in all other cases.

Alternatively it is determined that the depth is $M_2$ if the amplitude level of sig [B] is greater than or equal than (lev1+lev2)/2, and the depth is $M_1$ if the level is less than this value.

Alternatively this determining may also be performed using the hardware shown in FIG. 2, from the output of a comparator 21 which compares the signal from a digital analog converter 20 which converts basZ to an analog signal with sig [B].

However in the case of both software and hardware, the determining of amplitude level must be performed when sig [A] crosses its center, and when sig [B] is in the vicinity of its negative peak value.

The peak values of sig [A], sig [B] output by the magnetic sensor 4, and the absolute positions at the reference points to be hereinafter described, are stored in a RAM 19 in FIG. 2. A battery back-up is provided so that the contents of the RAM 19 are retained even if power to the CPU 14 is interrupted.

Figure 11:
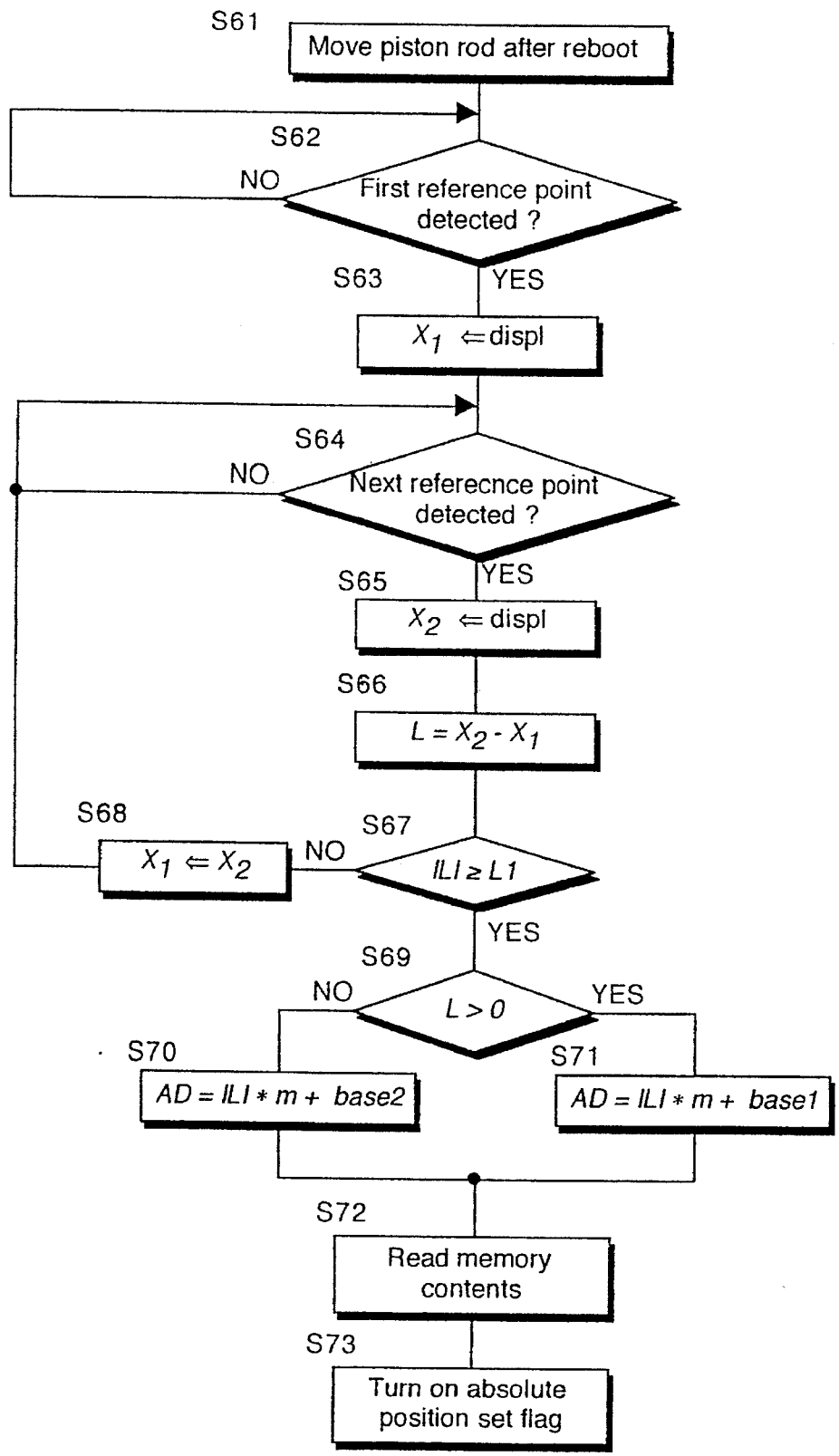
FIG. 11 is a flowchart showing a reference point detection process when power is restored according to the first embodiment.

The control unit 10 begins the processing shown in FIG. 11 when power to the CPU 14 is switched on.

First, the first reference point is detected depending on the direction of the stroke of the piston rod 1 (S61, 62), and displacement data (displ computed in S65 of FIG. 8) which are based on the output signals sig [A], sig [B] of the magnetic sensor 4, are stored in a parameter $X_1$ (S62, 63).

After entering the stroke position in $X_1$, displacement data are entered in a parameter $X_2$ when the second reference point is detected (S64–65). Next, the reference point interval $L=X_2-X_1$ is computed from the values of the two parameters $X_1$, $X_2$ (S66). The detection of the reference points is performed, when sig [A] is equal to its center level cen [A], when sig [B] is near its negative peak value, and when the value of sig [B] is greater than the reference point determining level basZ.

After detecting these two reference points, the direction of the movement of the piston rod 1 is examined from the reference point interval L (S69).

If L>0, the piston rod 1 is moving to a more elongated position (left-hand direction of FIG. 1), if on the other hand L<0, the piston rod 1 is moving to a more contracted position.

|L|<$L_0$ means the same reference point has passed twice Ill succession. In such an erroneous case, the value of $X_2$ is then shifted to $X_1$, the program returns to step 64, and the reference point detection is performed again (S67, 68, 64).

When the direction of the rod movement has been determined, an address AD is computed from the absolute value |L| of the reference point interval for each of the directions by using the following equations:

L>0: AD=|L|* m+base 1

L<0: AD=|L|* m+base 2 where base 1, 2 are conversion constants (integers) and m is a conversion coefficient (S69, 70 and S69, 71).

This address AD indicates the storage location in the RAM 19 of the absolute position of the second reference point corresponding to the absolute value |L| of the reference point interval.

Figure 12:
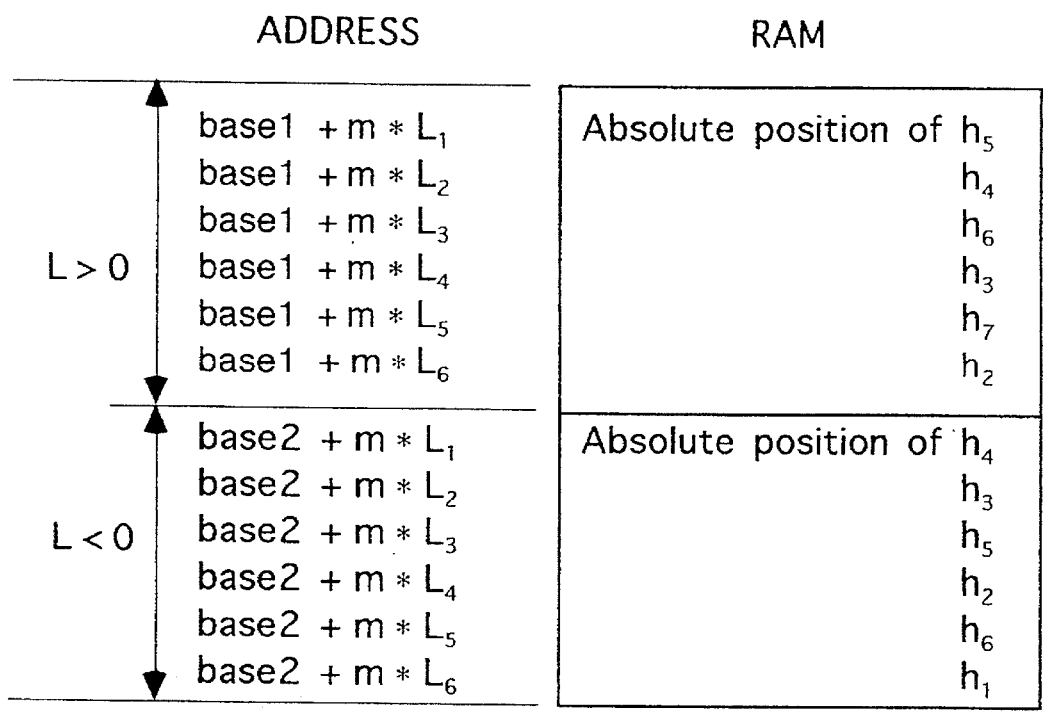
FIG. 12 is an explanatory diagram showing storage addresses of absolute positions of the reference points according to the first embodiment.

The contents of the RAM 19 in which this absolute position is stored are shown in FIG. 12.

For example, taking the case L>0, the second reference point is detected when $h_2 - h_7$ in FIG. 1 have passed, and the absolute positions of $h_2-h_7$ are respectively stored in the same number of address locations. If for example $h_7$ has passed as the second reference point, the reference point interval $L=L_5$, and the absolute position of $h_7$ is stored in the RAM 19 at a location specified by the relation AD=$L_5$, m+base 1.

In this way, the absolute positions of reference points for each of the above two regions corresponding to the displacement direction are stored separately in the RAM 19 as shown in FIG. 12.

The control unit 10 reads the absolute positions set in the storage locations indicated by the addresses AD, and updates the read value by the displacement data the parameter $X_2$ (S72). This updating of displacement data need be performed only once when power is restored.

When the piston rod 1 is displaced due to an internal leak of working oil after power has been interrupted, the real stroke position of the piston rod 1 after displacement and the displacement data will no longer correspond. However, by resetting the real positions as displacement data when the second reference point is detected, the displacement of the piston rod 1 when power is interrupted is corrected, and the displacements are thereby measured based on the reference points each time power is switched on.

The constant m is used to convert the reference point interval to all integral value, and is suitably set depending on the reference point interval L and the number of words required to store the absolute positions.

When updating of the displacement is completed, information to this effect is output from the CPU 14. This makes it possible to identify whether position detection is performed before or after updating of the displacement data.

However, in order to use the absolute positions of the storage locations of the RAM 19 indicated by the addresses AD, the absolute position data must first be initialized in those locations.

Figure 13:
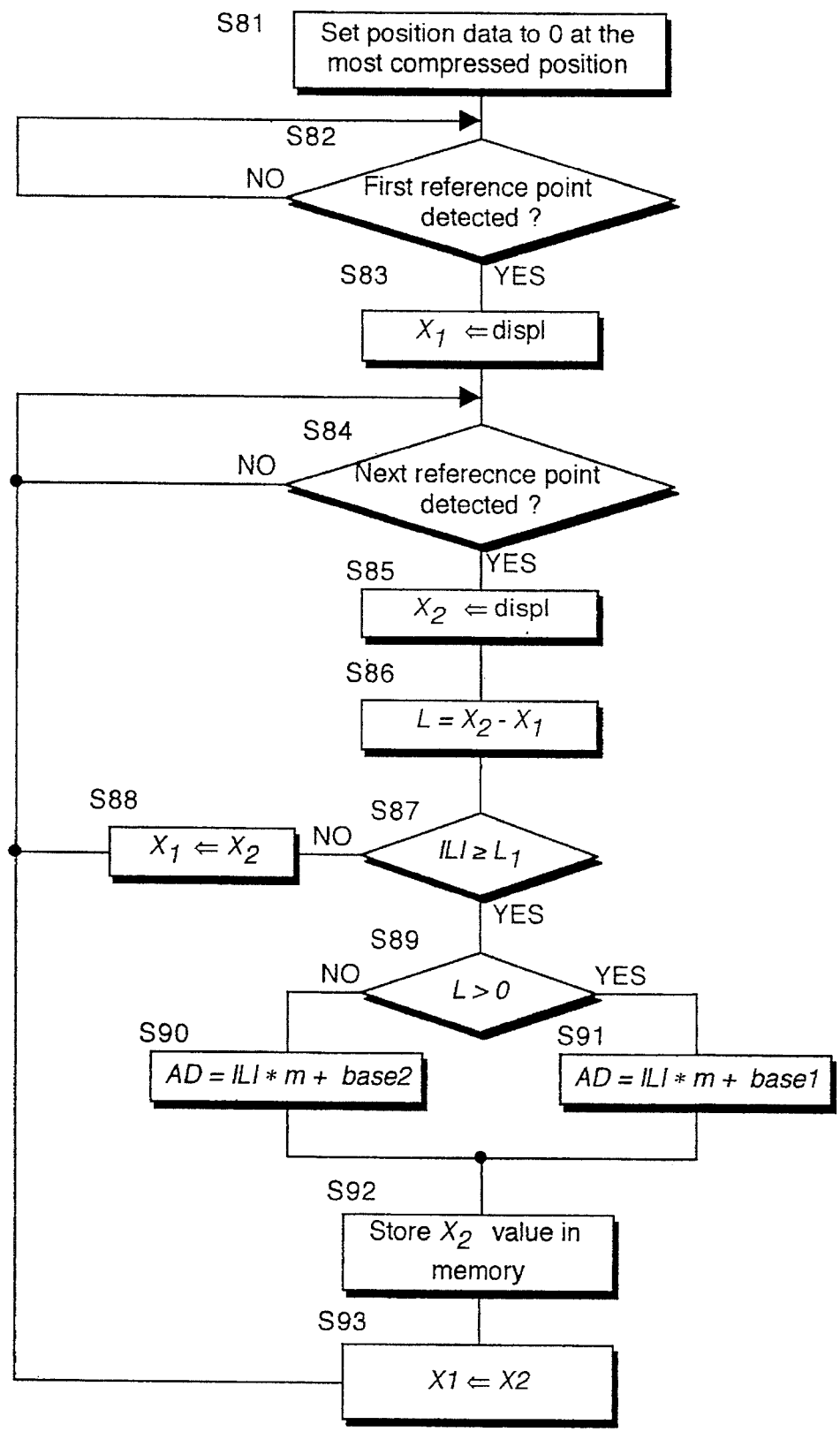
FIG. 13 is similar to FIG. 11, but showing a process of storing data of the absolute positions of the reference points.

The control unit 10 therefore initializes the absolute positions of each reference point according to the flow chart as shown in FIG. 13. The initialization algorithm is effectively the same as the algorithm used for the processing in FIG. 11.

First, the piston rod 1 is displaced to its most contracted position, and the counter value and fine displacement, fine displ, are set to zero (S81).

When the piston rod 1 elongates from its most contracted position to its most elongated position, L>0. The address AD is then computed in a step S91, the contents of the parameters $X_2$ in the storage location indicated by this address AD are read (S92), the value of $X_2$ is shifted to $X_1$ (S93), and the processing from when the second reference point is detected is repeated (S84–93).

In this way, the position data of the reference points $h_2$–$h_7$ shown in FIG. 1 are respectively stored in six locations corresponding to L>0 in FIG. 12.

In the same way, when the piston rod 1 is contracted from its most elongated to its most contracted position, L<0. The address AD is computed in a step S90, the parameter $X_2$ is entered in a storage location indicated by this address AD, and the position data of the six reference points $h_6$–$h_1$ are stored in six locations corresponding to L<0 in FIG. 12.

The initialized absolute position data is provided with a battery backup so that it can be used when power to the control unit 10 is switched on again after it has been cut. Even if the piston rod 1 moves for some reason when the power is off, if the adjacent reference point is detected when the power is switched back on, the displacement detected at that time is updated so that it matches the absolute position data. The effect of the displacement of the piston rod 1 when the power was interrupted is thereby eliminated, and high precision detection can then be performed based on the output signal of the magnetic sensor 4 until the power is cut. The battery backup after the power is interrupted need be provided only for the RAM 19 used for storing absolute position data, so there is no need to increase the capacity of the backup memory.

According to this embodiment, after the power is switched back on again, the displacement at the second reference point is updated only once by the stored absolute position data when any adjacent second reference point is detected. This updating may, however, be performed a plurality of times as necessary. For example, even after detecting the second reference point, the interval between adjacent reference points is suitably computed, and if the displacement corresponding to the second reference point and the read absolute position do not agree when they are compared, the displacement is updated by the absolute position.

The non-magnetic parts 2 were formed in only part of the piston rod 1, but if they are formed over the whole length of the piston rod 1, high precision detection can be performed even if the piston rod 1 rotates.

To prevent the piston rod 1 being displaced to its most contracted or most elongated positions, provision may be made for alarms to be emitted when the reference points $h_1$ and $h_7$, which are close to the most elongated or most contracted positions, are detected.

Further, the center crossover point of sig [A] was used as a reference point, and sig [B] was used for reference point identification, however the center crossover point of sig [B] may conversely be used as a reference point and sig [A] used for reference point identification.

Figure 14:
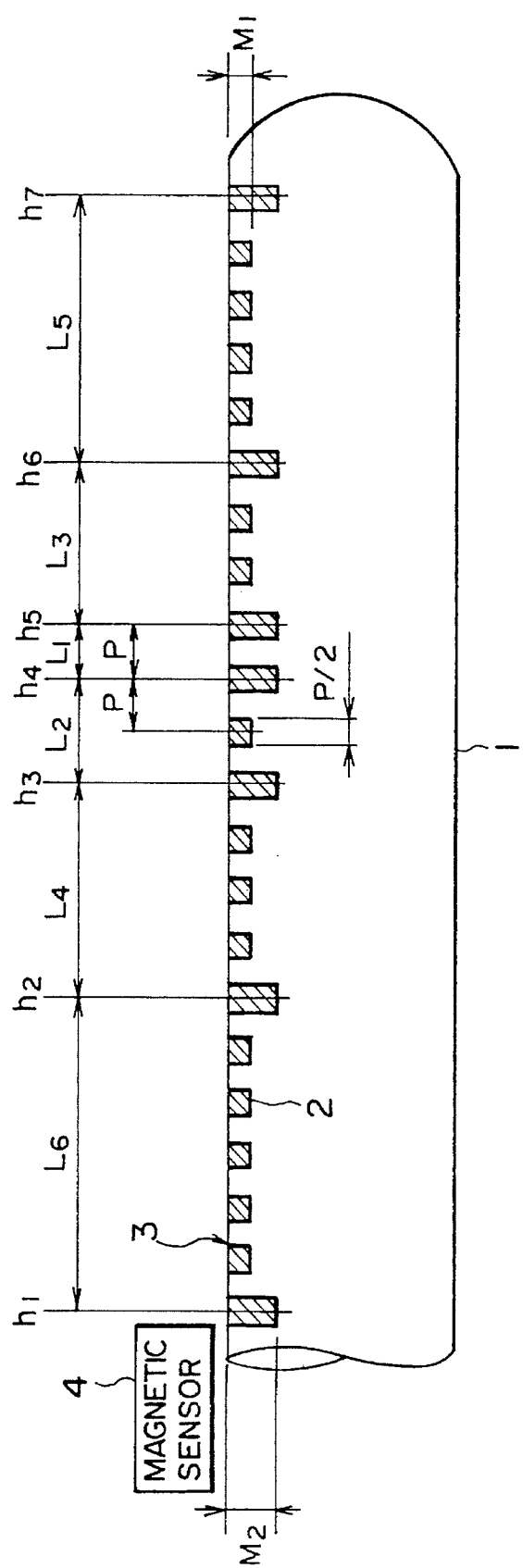
FIG. 14 is a schematic diagram of the magnetic scale according to a second embodiment of this invention.
Figures 15A, 15B:
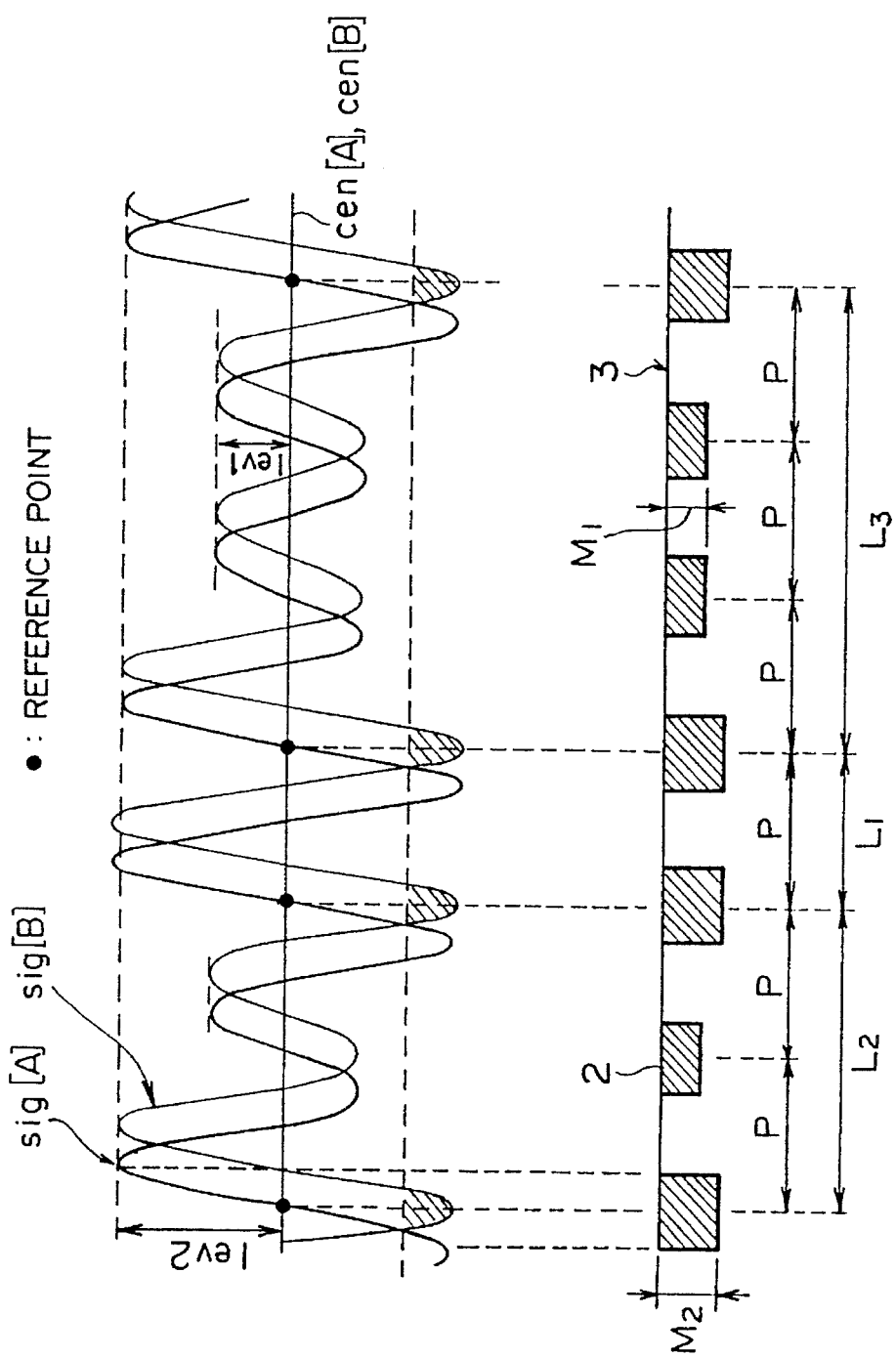
FIG. 15a and 15b are waveform diagrams of the magnetic sensor output signals according to the second embodiment.
Figure 16:
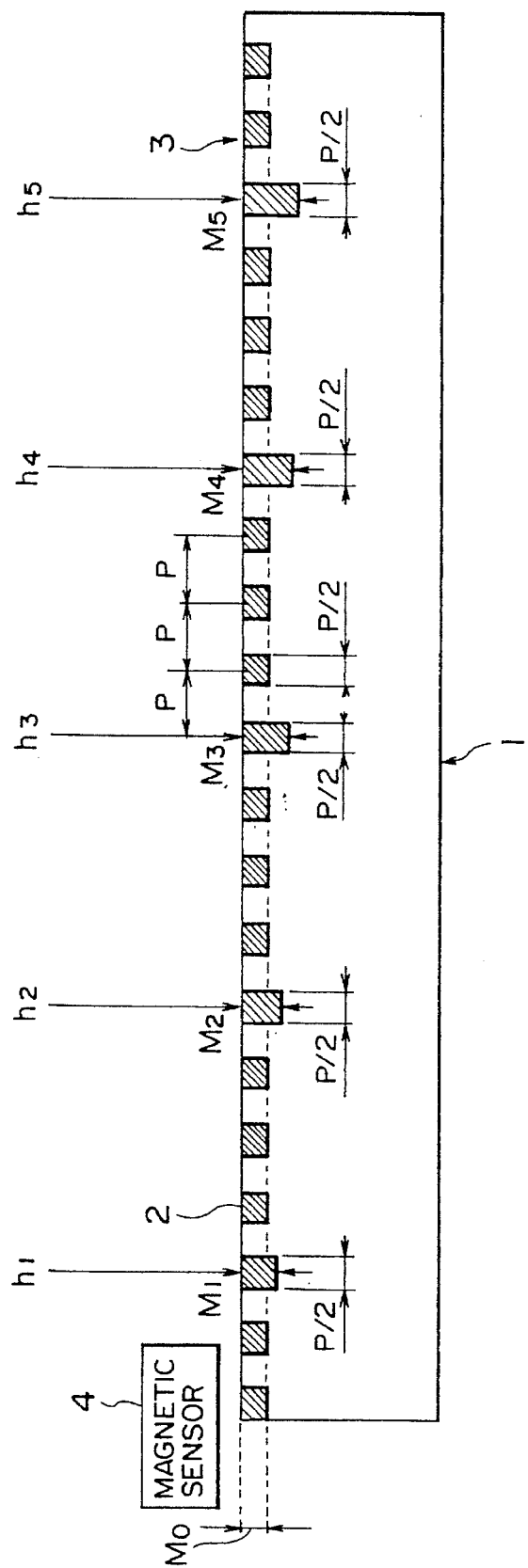
FIG. 16 is a schematic diagram of the magnetic scale according to a third embodiment of this invention.
Figure 17:
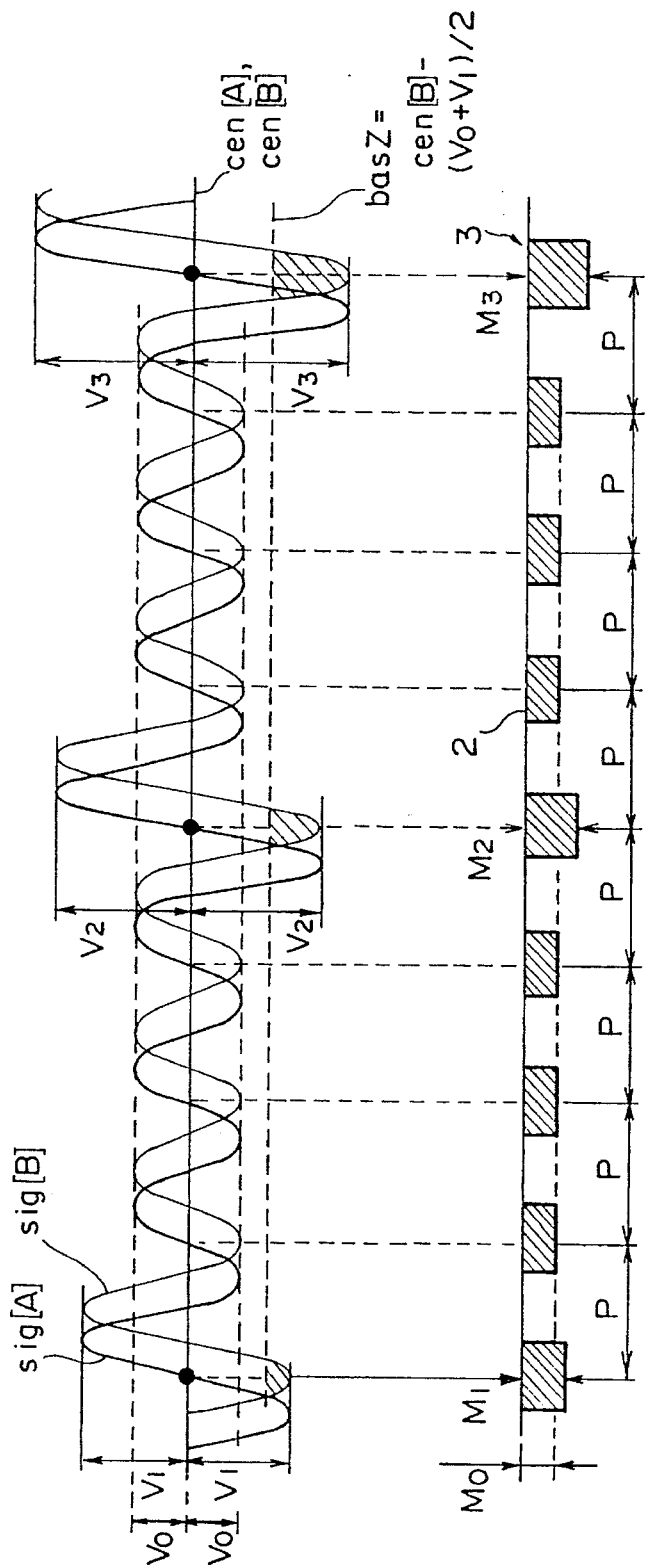
FIG. 17a and 17b are waveform diagrams of the magnetic sensor output signals according to the third embodiment.

FIGS. 14 and 15a–15b show a second embodiment of this invention.

In this embodiment, conversely to the first embodiment, the depth of the non-magnetic parts 2 comprising the reference points may be $M_2$, and the depth of the other non-magnetic points 2 may be set at $M_1$.

In this case, the detection condition for the reference points is different from those of the first embodiment. Here, the reference points are identified when sig [A] crosses the center level and sig [B] is below the determining level basZ, as shown FIG. 15a and 15b. The remainder of the construction is the same as that of the first embodiment.

FIGS. 16–19 show a third embodiment of this invention.

As in the previous two embodiments, the non-magnetic parts 2 which are not reference points are formed at a pitch interval P, and the non-magnetic parts 2 which are reference points are formed at an equal pitch interval 4P. However the non-magnetic parts 2 which are reference points are all formed with different depths $M_1$–$M_5$.

According to this embodiment, the outputs of sig [A] and sig [B] are all different according to the depths $M_1$–$M_5$ of the non-magnetic parts 2, so if the level of sig [B] is determined when sig [A] crosses its center level cen [A], it can be determined which of the reference points $h_1$–$h_5$ is involved.

According to this embodiment, therefore, the absolute position is defined by detecting only one reference point, there being no need to detect two.

Figure 18:
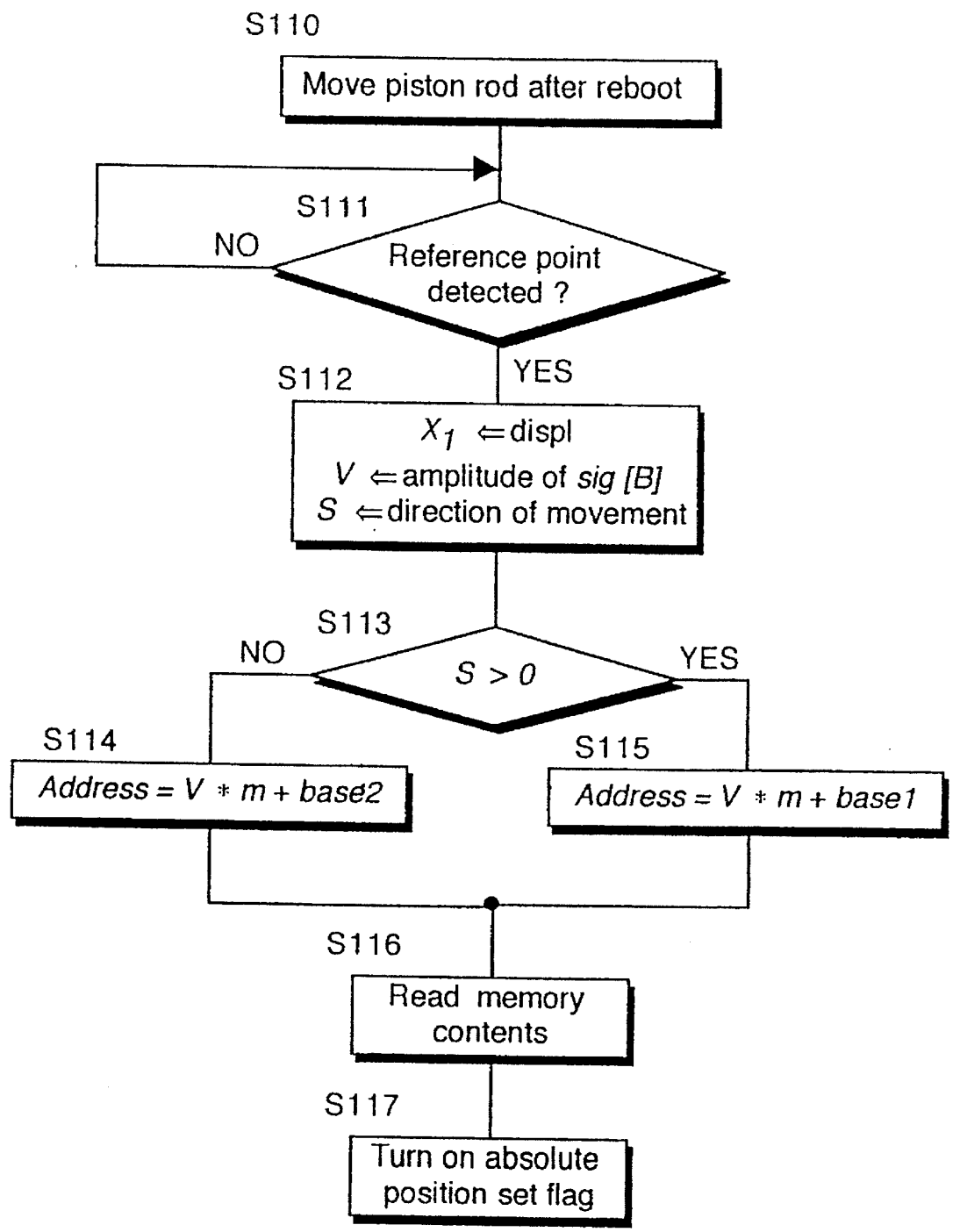
FIG. 18 is a flowchart showing the reference point detection process when power is restored according to the third embodiment.

After power is switched on and the piston rod 1 is moved in any direction (S110), as shown in FIG. 18, it is determined whether the output signal sig [A] of the magnetic sensor 4 has crossed its center level cen [A], and the other output signal sig [B] is below the reference point determining level basZ (S111).

When the reference point is detected, the displacement at that time is entered in a parameter X, the amplitude level of sig [B] is entered in a parameter V, and the sign of the displacement showing the displacement direction of the piston rod 1 is entered in a parameter S (S112).

The amplitude level V of sig [B] at the detected reference point is multiplied by a predetermined conversion coefficient m, and by adding the conversion constants base 1, 2, the addresses in the RAM 19 which store the absolute positions of the reference points are obtained (S114 or 115). In other words, the amplitude level V is used instead of the absolute value |L| of the reference point interval in the preceding first embodiment. By forming the non-magnetic parts 2 constituting the reference points with different depths $M_1-M_5$, the reference points can be identified by the amplitude level of sig [B].

Figure 19:
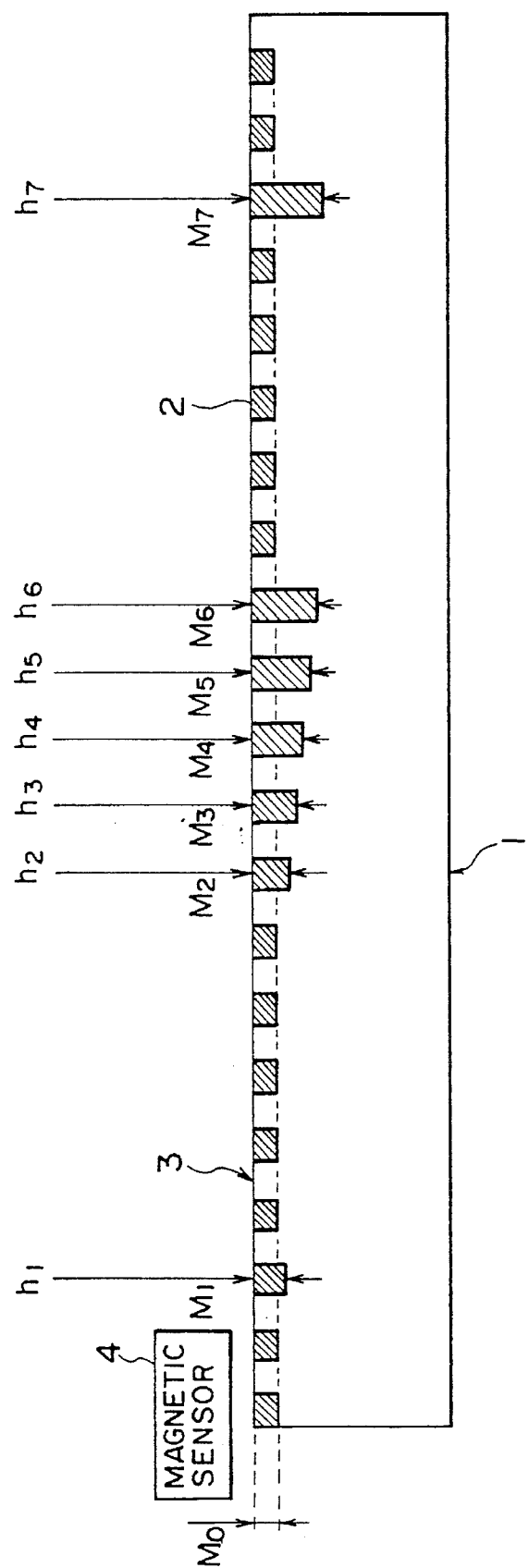
FIG. 19 is similar to FIG. 16, but showing another possible arrangement of the reference points.

In this case, as reference point detection is performed using the amplitude level of sig [B], the reference points do not necessarily have to be formed at equidistant intervals, it being possible to arrange them as shown for example in FIG. 19.

FIGS. 20–25 show a fourth embodiment of this invention.

Figure 20:
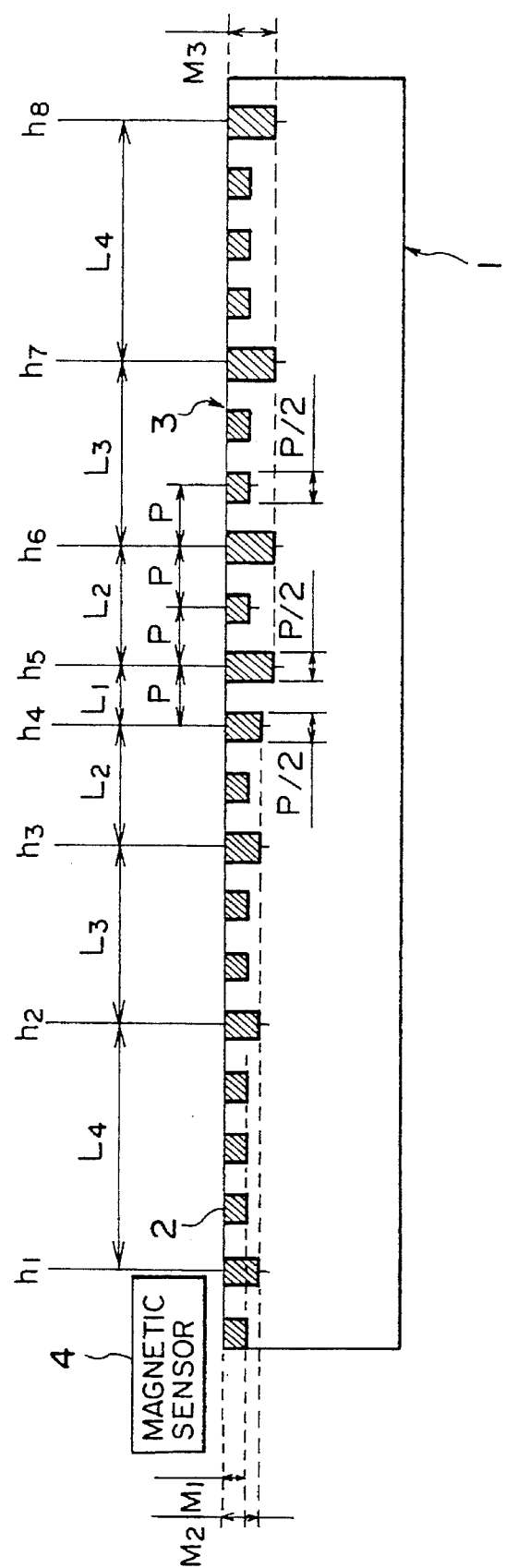
FIG. 20 is a schematic diagram of the magnetic scale according to a fourth embodiment of this invention.

According to this embodiment, reference points are symmetrically disposed to the left and right of the center of the piston rod 1 as shown in FIG. 20. The reference points situated to the left of the center of the figure are formed with a depth $M_2$, while those situated to the right are formed with a depth $M_3$. Further, the interval $L_1$ between the reference points immediately on either side of the center is set equal to the pitch interval P of the non-magnetic parts 2, the intervals between reference points $L_2$, $L_3$, $L_4$ progressively increasing by one pitch interval P from the center to both ends of the piston rod 1.

Figures 21A, 21B:
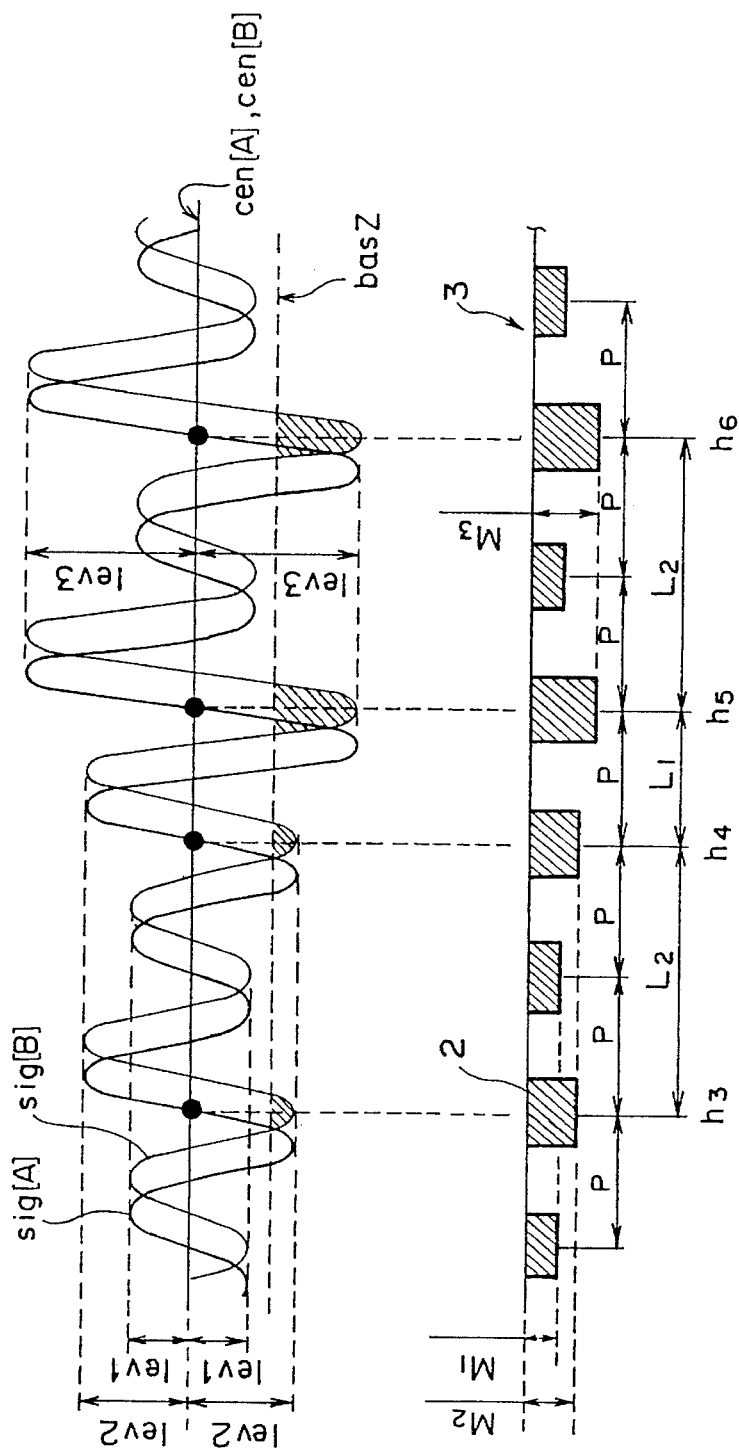
FIG. 21a and 21b are waveform diagrams of the magnetic sensor output signals according to the fourth embodiment.

In this case, the amplitude level of the output signal sig [B] of the magnetic sensor 4 at the reference points is lev2 on the left and lev3 on the right of the center of the rod I as shown in FIG. 21a and 21b.

Figure 22:
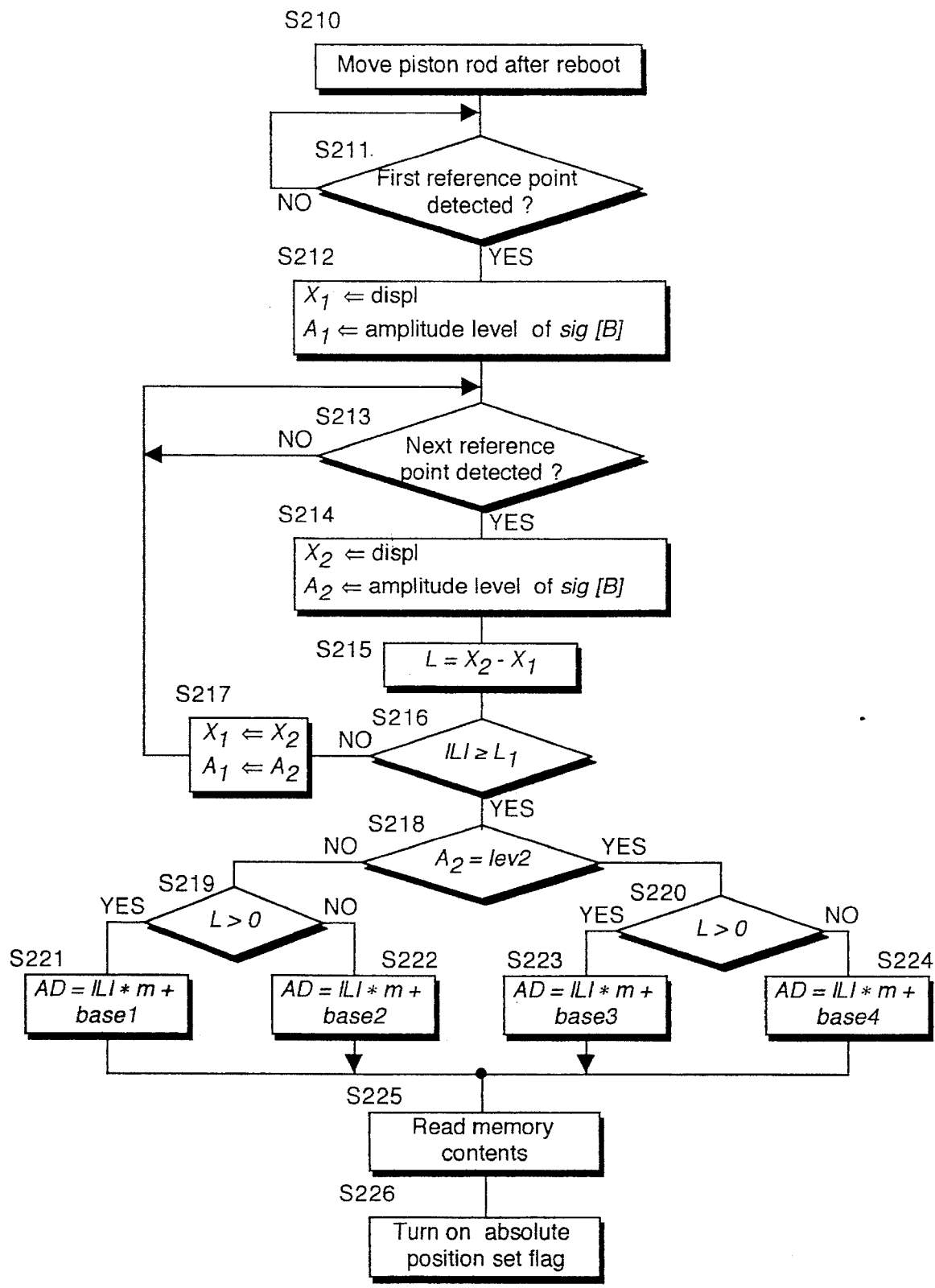
FIG. 22 is a flowchart showing the reference point detection process when power is restored according to the fourth embodiment.
Figure 23:
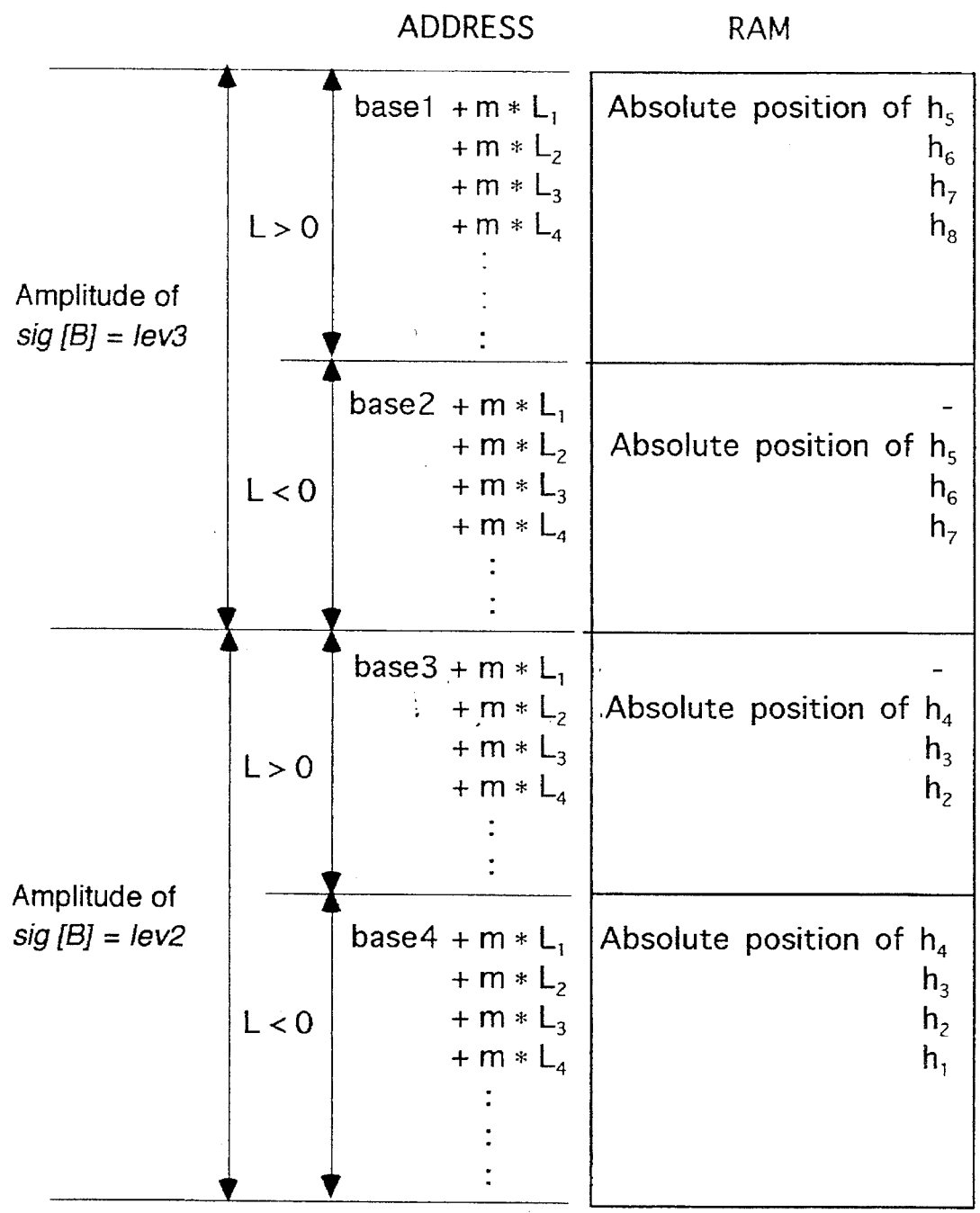
FIG. 23 is an explanatory diagram showing the storage addresses of the absolute positions of reference points according to the fourth embodiment.

The control unit 10, as shown in FIG. 22, finds the interval L between reference points in the same way as in the preceding first and second embodiments (S215). Further, it is determined whether or not the parameter A2 which stores the amplitude level of sig [B] at the second detected reference point is equal to lev2 (S218), and it is determined whether the detected reference point is situated to the left or right of the center of the piston rod 1. Addresses for storing absolute position data are then computed for each case according to the displacement direction of the piston rod 1 as in the preceding embodiments (S221, 222, 223 and 224). Addresses are therefore set in the RAM 19 according to the displacement direction of the piston rod 1 and the amplitude level of sig [B] as shown in FIG. 23.

Reference points having the same interval can therefore be arranged at two locations without not only by varying this interval, but also by varying the depth of the non-magnetic parts 2 which are reference points to the left and right of the center of the piston rod 1, and the number of different reference point intervals can thereby be reduced. The average displacement of the piston rod 1 required to detect absolute positions is therefore less than in the case of the preceding embodiments.

Figure 24:
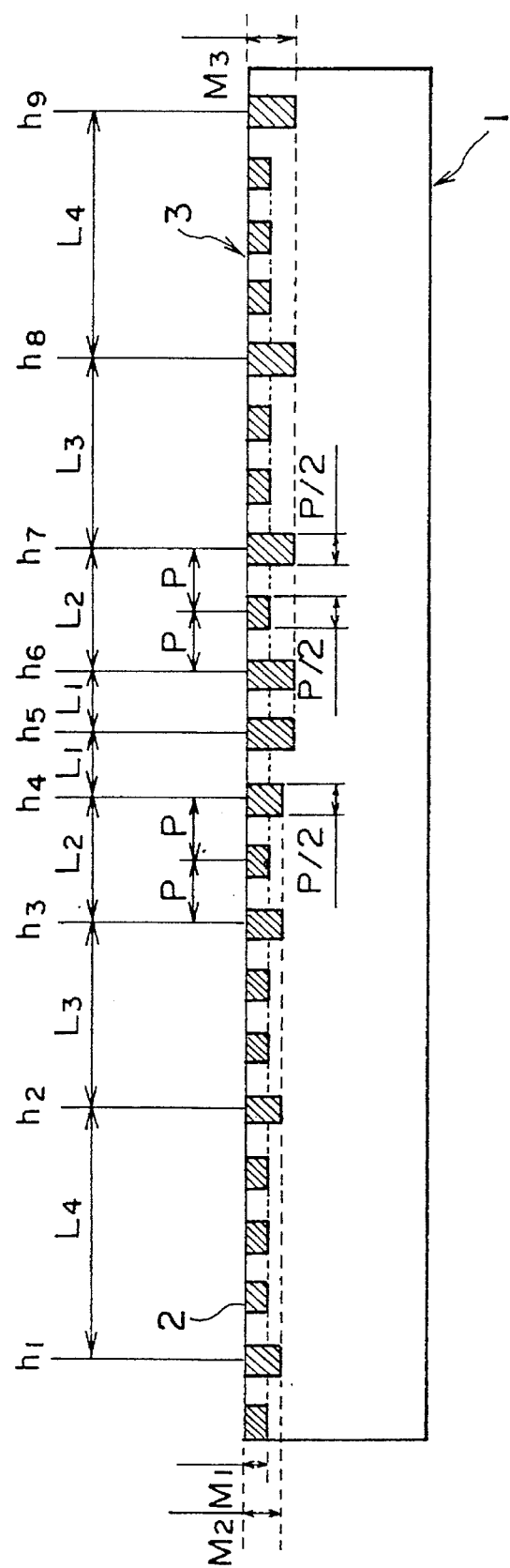
FIG. 24 is similar to FIG. 20, but showing another possible arrangement of the reference points.
Figure 25:
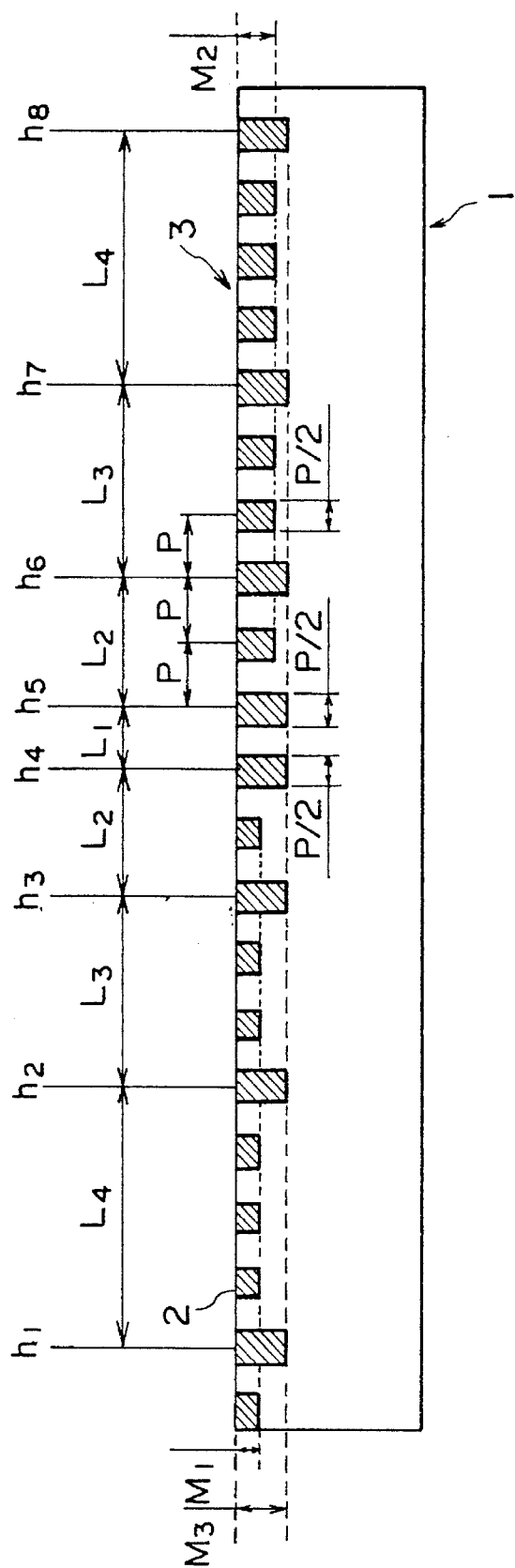
FIG. 25 is similar to FIG. 24, but showing yet another possible arrangement of the reference points.

Reference points having an interval $L_1$ may be provided on either side of the center of the piston rod 1 as shown in FIG. 24. Also, instead of having two different depths of the non-magnetic parts 2 which are reference points, the depths of the non-magnetic parts 2 which are not reference points may be varied to the left and right of the center of the piston rod 1 as shown in FIG. 25.

FIGS. 26–30 show a fifth embodiment of this invention.

Figure 26:
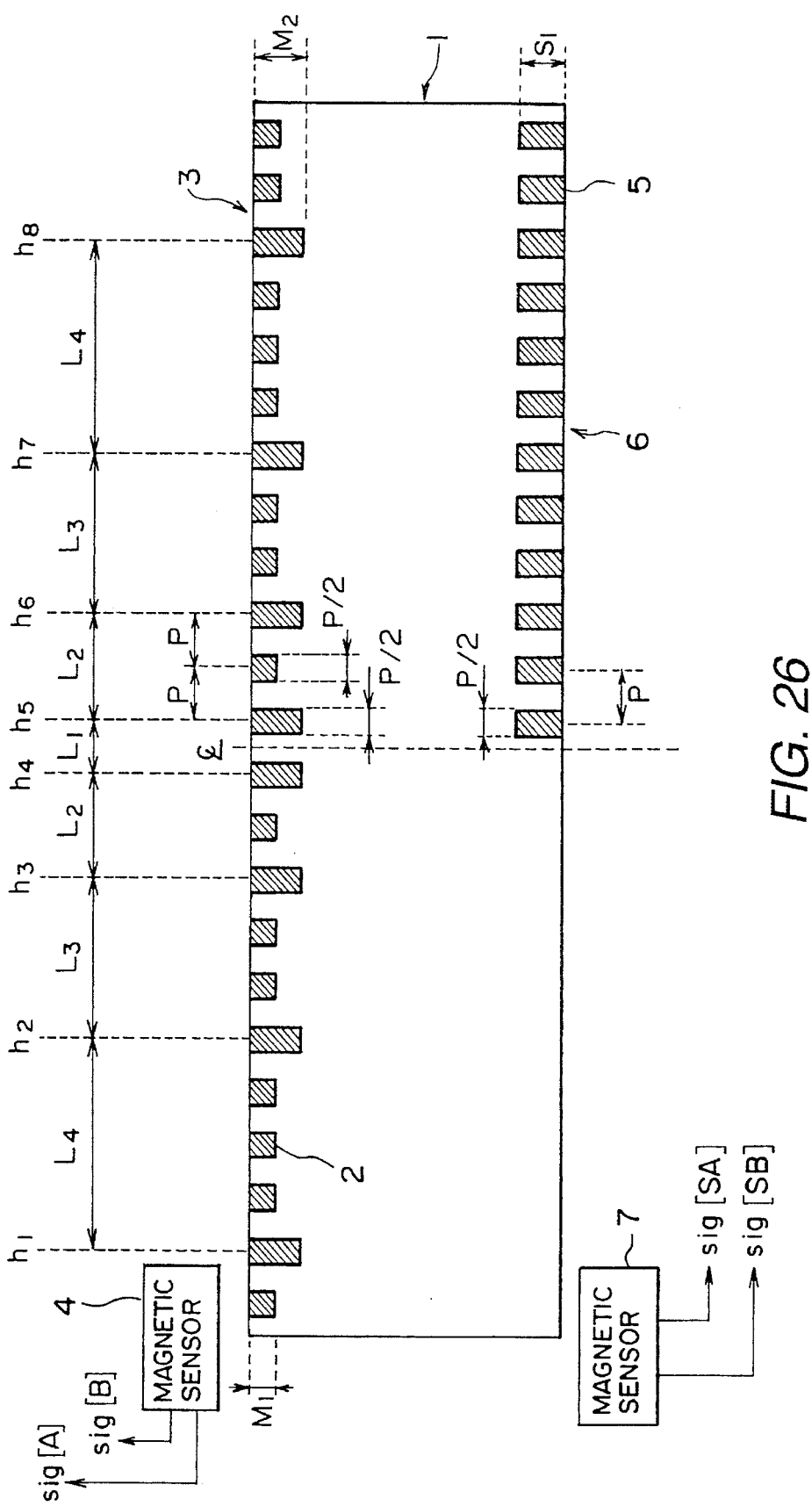
FIG. 26 is a schematic diagram of the magnetic scale according to a fifth embodiment of this invention.

According to this embodiment, in order to distinguish whether a reference point is situated on the left or right of the center of the piston rod 1 as in the case of the preceding fourth embodiment, a subscale 6 and a main scale 3 are provided in different positions as shown in FIG. 26.

As shown in the figure, the subscale 6 is formed only on the right of the center of the piston rod 1. The non-magnetic parts 5 comprising the subscale 6 are formed at an equal pitch interval P and with an equal depth.

The non-magnetic parts 2 of the main scale 3 are disposed in the same manner as in FIG. 24 of the preceding fourth embodiment. However the non-magnetic parts 2 which are reference points are formed with the same depth to the left and right.

Figure 27:
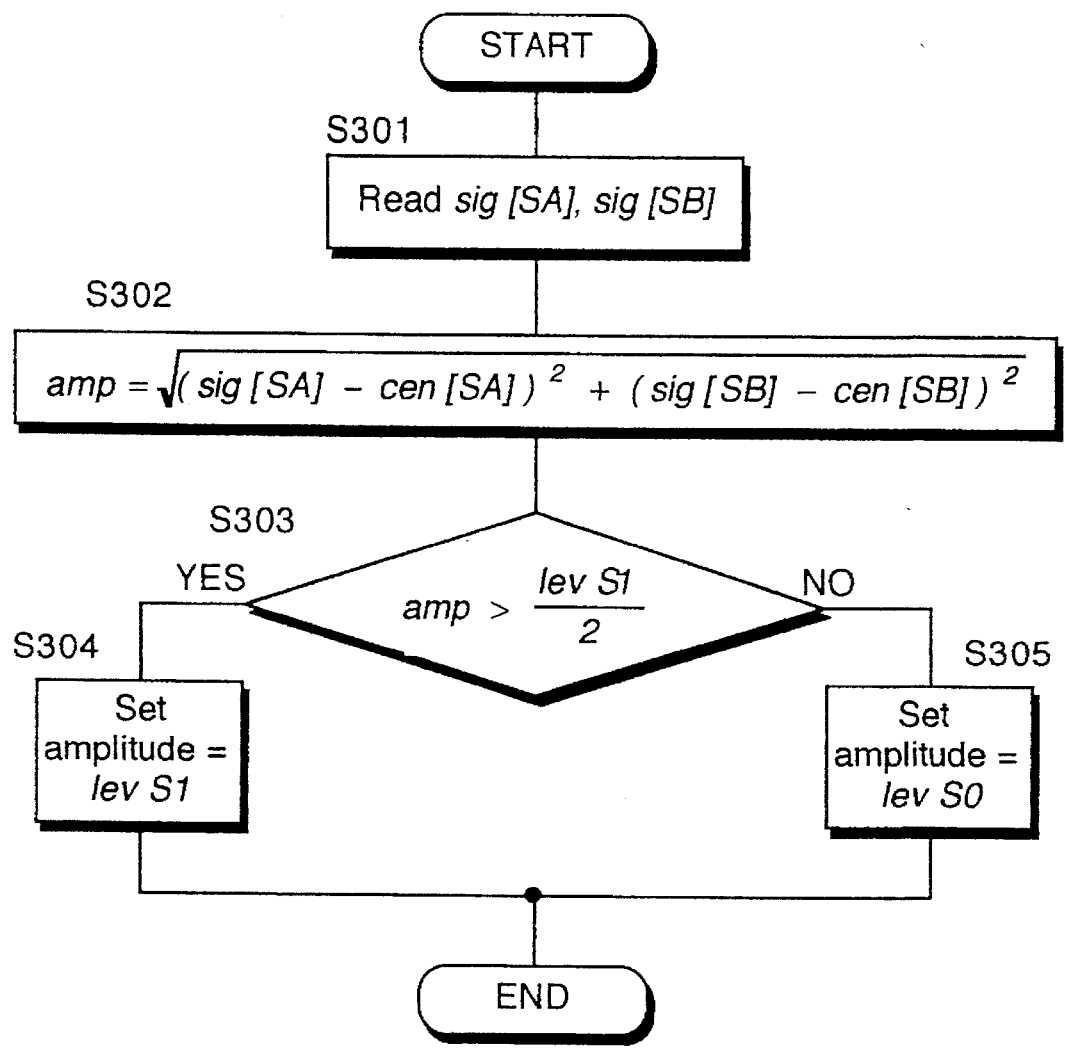
FIG. 27 is a flowchart showing an amplitude level determining process of a subscale magnetic sensor output signal according to the fifth embodiment.

The control unit 10, based on the two phase output signals sig [SA], sig [SB] from a magnetic sensor 7, determines whether the reference point detected from the output signal of the magnetic sensor 4 according to the flowchart of FIG. 27, is situated to the left or right of the center of the piston rod 1.

Figure 29A:
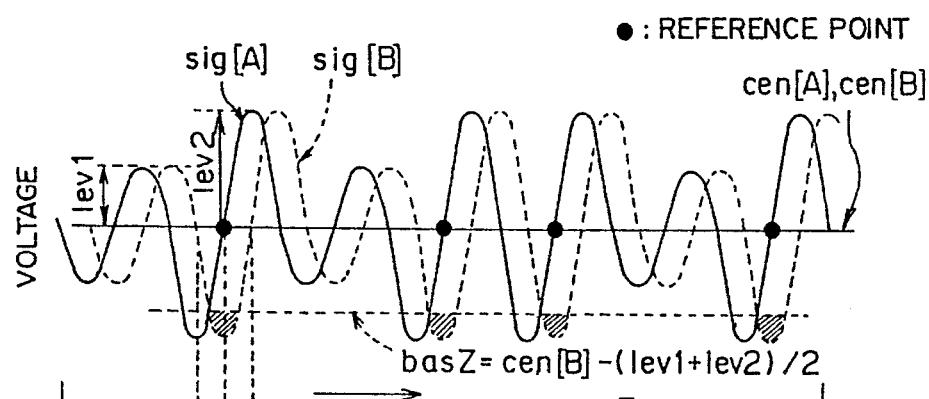
FIG. 29a–29c are waveform diagrams showing the output signals of the magnetic sensors according to the fifth embodiment.
Figure 29B:
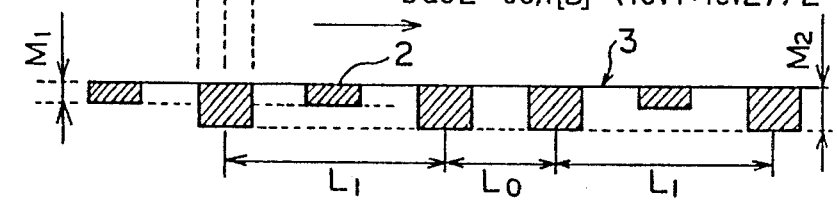
Figure 29C:
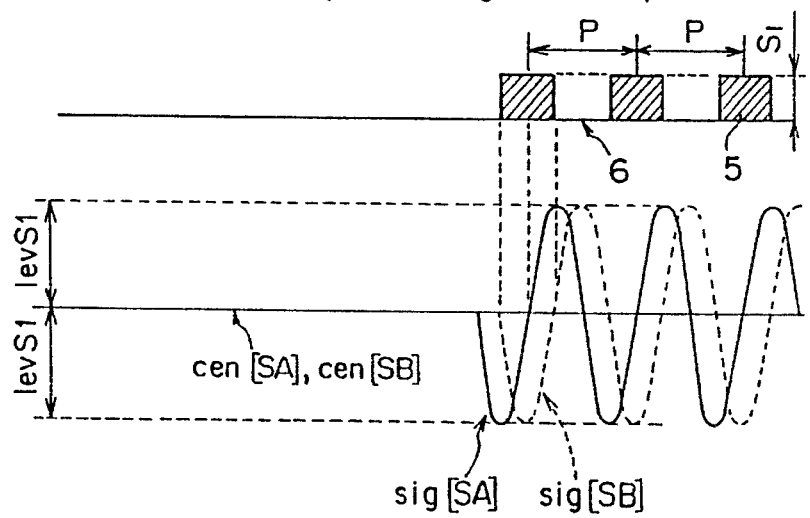

If the maximum value of the amplitude of the output signal from the magnetic sensor 7 is lev S1, and the center levels are cen [SA] and cen [SB], as shown in FIG. 29a–29c, the control unit 10 computes the amplitude amp from the following equation (S302):

$$amp = \sqrt{(sig[SA] - cen[SA])^2 + (sig[SB] - cen[SB])^2}$$

This amplitude amp is then compared with a preset level lev S1 /2; if amp is greater, the amplitude level V is set to levS1 (S304), otherwise the amplitude level V is set to levS0 (S305). In FIG. 26 levS1 refers to the right, and levS0 to the left, of the center position.

Figure 28:
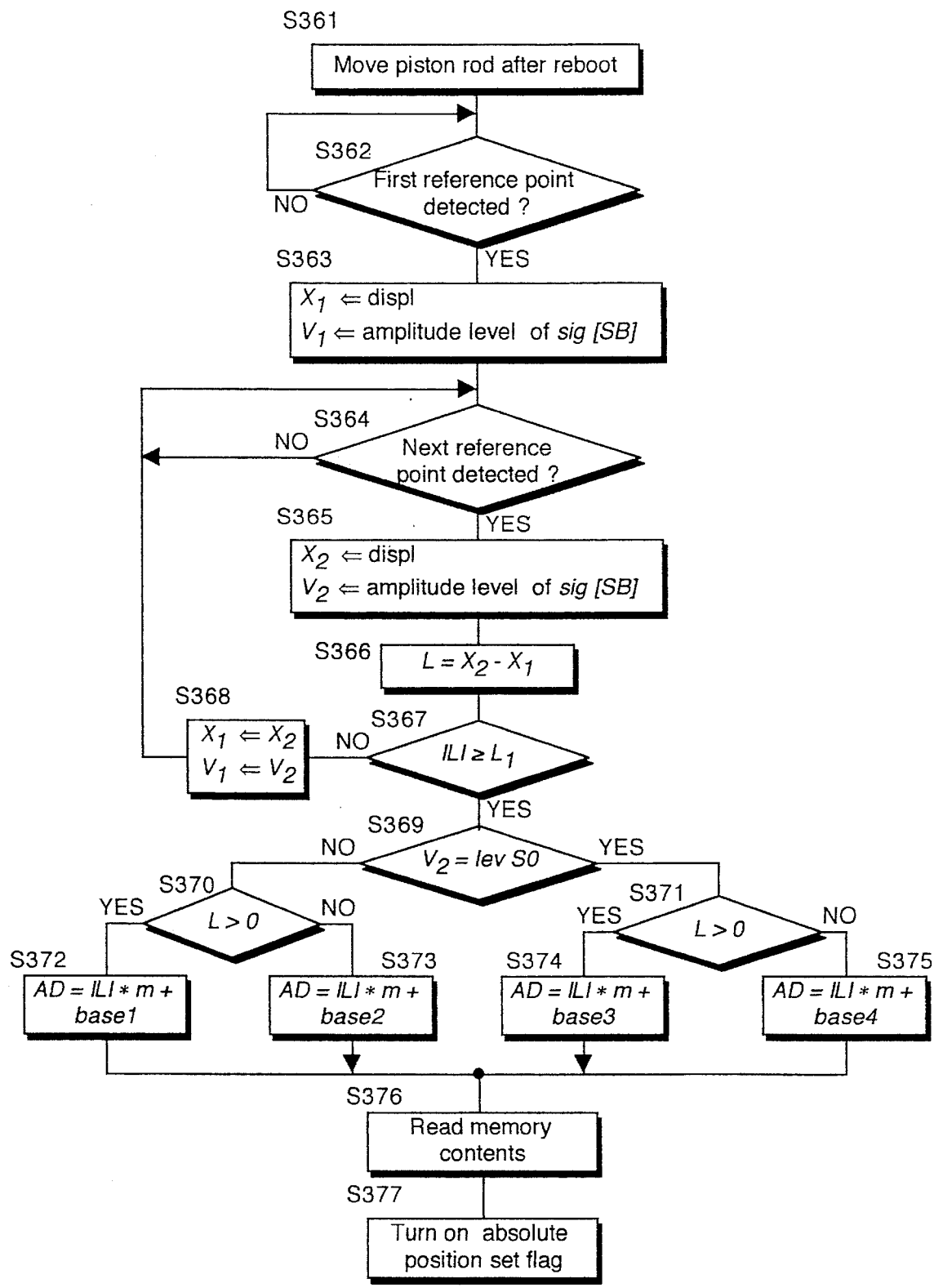
FIG. 28 is a flowchart showing the reference point detection process when power is restored according to the fifth embodiment.

It is then determined, according to the flowchart of FIG. 28, whether or not the amplitude level V2 at the second detected reference point is equal to levS0 (S369). After determining whether the reference point is on the left or right of the center of the piston rod 1 in this way, addresses of the absolute positions are computed for each case according to the displacement direction of the piston rod 1 as described for the preceding fourth embodiment (S372, 373,374 and 375).

In this embodiment, the number of different reference point intervals may be reduced as in the fourth embodiment so that the average displacement of the piston rod 1 required to detect the absolute positions is less.

Figure 30:
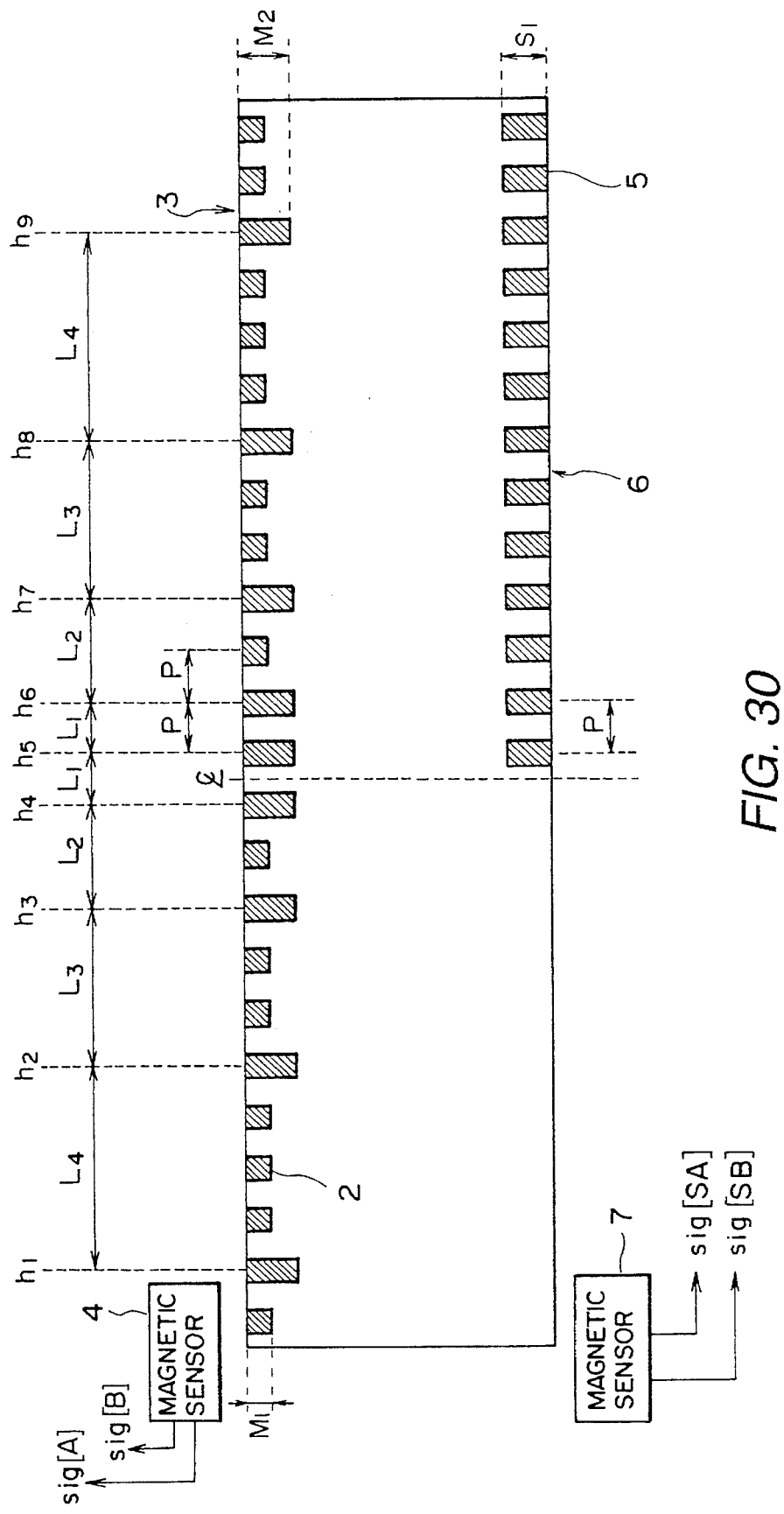
FIG. 30 is similar to FIG. 26, but showing another possible arrangement of the reference points.

The main scale 3 may also be disposed such that there is another reference point interval $L_1$ as shown in FIG. 30.

What is claimed:

1. A rod axial position detector for a rod made of magnetic material, comprising:

a magnetic scale comprising a plurality of non-magnetic parts arranged axially on the rod at an equal pitch interval, said non-magnetic parts comprise first non-magnetic parts having a constant depth and second non-magnetic parts having a different depth, and said second non-magnetic parts are disposed such that intervals between said second non-magnetic parts are all different in spacing along said rod, a magnetic sensor fixed opposite said scale, said sensor outputting a signal according to a positional change of said non-magnetic parts, said sensor comprising means for outputting signals according to the depth of the non-magnetic part passing by said sensor, and means for detecting a current position of said rod based on the output signal of said magnetic sensor, said position detecting means comprising:

means for identifying a second non-magnetic part which has passed said magnetic sensor based on the output signal of said magnetic sensor, and said identifying means comprises means for detecting the intervals between said second non-magnetic parts which have passed said magnetic sensor from the output signal of said sensor, and means for specifying said second non-magnetic parts which have passed said magnetic sensor from said detected intervals, a memory for individually storing absolute positions of said second non-magnetic parts, means for calculating a displacement amount from said identified second non-magnetic part to the current position of the rod based on the output signal of said magnetic sensor, and means for calculating an absolute position of the rod from the absolute position of the identified second non-magnetic part and said calculated displacement amount.

2. A rod axial position detector as defined in claim 1, wherein said magnetic sensor comprises two sensor units which output two sine waves having a 90 degrees phase difference depending on the positional change of the non-magnetic parts of said magnetic scale, and said displacement amount calculating means comprises means for calculating a center level from peak values at every pitch interval of said sine waves, means for detecting that a non-magnetic part has passed said magnetic sensor based on a comparison of said center level and said sine waves, means for counting a number of said passed non-magnetic parts, means for correcting said sine waves such that they have equal amplitude at every pitch interval of said non-magnetic parts, means for calculating a distance between the non-magnetic part which has most recently passed said magnetic sensor and the magnetic sensor by an inverse trigonometric function calculation applied to said two sine waves, and means for calculating the displacement amount of the rod from said counted number and calculated distance.

3. A rod axial position detector for a rod made of magnetic material, comprising:

a magnetic scale comprising a plurality of non-magnetic parts arranged axially on the rod at an equal pitch interval, said non-magnetic parts comprise first non-magnetic parts having a constant depth and second non-magnetic parts having a different depth, said second non-magnetic parts are symmetrically disposed on both sides of a predetermined position on the rod, and intervals between said second non-magnetic parts are all different in spacing along said rod on one side of said predetermined position, a magnetic sensor fixed opposite said scale, said sensor outputting a signal according to a positional change of said non-magnetic parts, said sensor comprising means for outputting signals according to the depth of the non-magnetic part passing by said sensor, and means for detecting a current position of said rod based on the output signal of said magnetic sensor, said position detecting means comprising:

means for identifying a second non-magnetic part which has passed said magnetic sensor based on the output signal of said magnetic sensor, and said identifying means comprises means for distinguishing on which side of said predetermined position said magnetic sensor is situated, means for detecting the intervals between said second non-magnetic parts which have passed said magnetic sensor from the output signal of said sensor, and means for specifying said second non-magnetic parts which have passed said magnetic sensor from said distinguished side and said detected intervals, a memory for individually storing absolute positions of said second non-magnetic parts, means for calculating a displacement amount from said identified second non-magnetic part to the current position of the rod based on the output signal of said magnetic sensor, and means for calculating an absolute position of the rod from the absolute position of the identified second non-magnetic part and said calculated displacement amount.

4. A rod axial position detector as defined in claim 3, wherein said second non-magnetic parts on one side of said predetermined position have a different depth from said second non-magnetic parts on another side, and said distinguishing means comprises means for determining the depths of said second non-magnetic parts from the output signal of said magnetic sensor.

5. An axial position detector for a rod made of magnetic material, comprising;

a first magnetic scale comprising a plurality of non-magnetic parts arranged axially on the rod at an equal pitch interval, a first magnetic sensor fixed opposite said scale, said first magnetic sensor outputting a signal according to a positional change of said non-magnetic parts, and means for detecting a current position of said rod based on the output of said magnetic sensor, said non-magnetic parts comprising first non-magnetic parts having a constant depth and second non-magnetic parts having a different depth, said second nonmagnetic parts being symmetrically disposed on both sides of a predetermined position on the rod, intervals between said second non-magnetic parts being all different in spacing along said rod on one side of said predetermined position, said first magnetic sensor comprising means for outputting signals according to the depth of the non-magnetic part passing by said sensor, said detector further comprising a second magnetic scale disposed on one side of said predetermined position parallel to said first magnetic scale and a second magnetic sensor provided at a fixed position which outputs a signal according to a positional change of said second magnetic scale, and said position detecting means comprising:

means for distinguishing on which side of said predetermined position said first magnetic sensor is situated from the output signal of said second magnetic sensor, means for identifying a second non-magnetic part which has passed said first magnetic sensor based on said distinguished side and the output signal of said first magnetic sensor, a memory for individually storing absolute positions of said second non-magnetic parts, means for calculating a displacement amount from said identified second non-magnetic part to the current position of the rod based on the output of said first magnetic sensor, and means for calculating an absolute position of the rod from the absolute position of said identified second non-magnetic part and said calculated displacement amount.

* * * * *